United States Patent
Edamura et al.

(10) Patent No.: US 10,302,028 B2
(45) Date of Patent: May 28, 2019

(54) WORK MACHINE, POWER UNIT, AND DIESEL ENGINE OF WORK MACHINE

(71) Applicants: Hitachi Construction Machinery Co., Ltd., Taito-ku, Tokyo (JP); Kabushiki Kaisha Toyota Jidoshokki, Kariya-shi, Aichi (JP)

(72) Inventors: Manabu Edamura, Kasumigaura (JP); Yuusuke Kajita, Ushiku (JP); Masatoshi Hoshino, Tsuchiura (JP); Kouji Ishikawa, Kasumigaura (JP); Kentarou Itoga, Tsukuba (JP); Naoki Ishikawa, Kariya (JP); Tsutomu Umehara, Kariya (JP)

(73) Assignees: Hitachi Construction Machinery Co., Ltd., Tokyo (JP); Kabushiki Kaisha Toyota Jidoshokki, Kariya-shi (JP)

( * ) Notice: Subject to any disclaimer, the term of this patent is extended or adjusted under 35 U.S.C. 154(b) by 135 days.

(21) Appl. No.: 15/544,791

(22) PCT Filed: Feb. 10, 2015

(86) PCT No.: PCT/JP2015/053712
§ 371 (c)(1),
(2) Date: Jul. 19, 2017

(87) PCT Pub. No.: WO2016/129066
PCT Pub. Date: Aug. 18, 2016

(65) Prior Publication Data
US 2017/0350327 A1 Dec. 7, 2017

(51) Int. Cl.
*F02D 29/04* (2006.01)
*F02D 31/00* (2006.01)
(Continued)

(52) U.S. Cl.
CPC .............. *F02D 29/04* (2013.01); *B60L 11/12* (2013.01); *B60L 11/14* (2013.01); *B60L 15/20* (2013.01);
(Continued)

(58) Field of Classification Search
CPC ....... F02D 29/04; F02D 31/007; E02F 9/2246
See application file for complete search history.

(56) References Cited

U.S. PATENT DOCUMENTS 9,399,856 B2 * 7/2016 Fujishima ............. B60W 20/00
2003/0230276 A1 * 12/2003 Kataoka .................... F02B 1/12
123/295
(Continued)

FOREIGN PATENT DOCUMENTS

EP 2 716 822 A1 4/2014
JP 2001-41089 A 2/2001
(Continued)

OTHER PUBLICATIONS

International Search Report (PCT/ISA/210) issued in PCT Application No. PCT/JP2015/053712 dated May 19, 2015 with English translation (six pages).
(Continued)

*Primary Examiner* — Thomas E Lazo
(74) *Attorney, Agent, or Firm* — Crowell & Moring LLP

(57) ABSTRACT

Provided are a work machine, a power unit, and a diesel engine of a work machine that make it possible to reduce emitted noxious substances to levels below reference values stipulated by exhaust gas regulations in advanced countries and regions while also omitting or simplifying a post-treatment device. A hydraulic pump is driven by a diesel engine that limits maximum output torque in a low revolution speed region lower than a high revolution speed region including a rated revolution speed in such a manner that the
(Continued)

maximum output torque has a characteristic of intermediate torque lower than torque of a maximum output horsepower point at the rated revolution speed, and a hydraulic actuator is driven by hydraulic fluid delivered from the hydraulic pump.

15 Claims, 17 Drawing Sheets

(51) Int. Cl.
| | |
|---|---|
| F02D 41/00 | (2006.01) |
| F02D 41/06 | (2006.01) |
| F02D 41/38 | (2006.01) |
| F02D 45/00 | (2006.01) |
| F02D 41/02 | (2006.01) |
| F02D 41/30 | (2006.01) |
| B60L 15/20 | (2006.01) |
| B60L 11/12 | (2006.01) |
| B60L 11/14 | (2006.01) |
| E02F 9/22 | (2006.01) |
| F02M 26/05 | (2016.01) |
| F02M 26/10 | (2016.01) |
| F02M 26/33 | (2016.01) |
| B60W 30/18 | (2012.01) |

(52) U.S. Cl.
CPC .......... *E02F 9/2246* (2013.01); *F02D 31/007* (2013.01); *F02D 31/009* (2013.01); *F02D 41/005* (2013.01); *F02D 41/0057* (2013.01); *F02D 41/0072* (2013.01); *F02D 41/021* (2013.01); *F02D 41/061* (2013.01); *F02D 41/3035* (2013.01); *F02D 41/3827* (2013.01); *F02D 45/00* (2013.01); *B60L 2200/40* (2013.01); *B60L 2240/441* (2013.01); *B60L 2240/443* (2013.01); *B60W 30/18* (2013.01); *B60W 2300/17* (2013.01); *B60W 2710/0644* (2013.01); *F02D 2200/101* (2013.01); *F02D 2250/26* (2013.01); *F02M 26/05* (2016.02); *F02M 26/10* (2016.02); *F02M 26/33* (2016.02); *Y02T 10/47* (2013.01); *Y02T 10/645* (2013.01); *Y02T 10/7077* (2013.01); *Y02T 10/72* (2013.01); *Y02T 10/7275* (2013.01)

(56) References Cited

U.S. PATENT DOCUMENTS

| | | | |
|---|---|---|---|
| 2004/0088103 | A1 | 5/2004 | Itow et al. |
| 2010/0319321 | A1 | 12/2010 | Kamiya et al. |
| 2011/0251746 | A1* | 10/2011 | Wu .................. B60K 6/48 701/22 |
| 2013/0090835 | A1* | 4/2013 | Take ................ F02D 29/04 701/103 |
| 2014/0020375 | A1* | 1/2014 | Fujishima ........ B60W 20/00 60/431 |
| 2014/0032081 | A1 | 1/2014 | Willi et al. |
| 2014/0188373 | A1* | 7/2014 | Kawaguchi ...... E02F 9/2075 701/110 |

FOREIGN PATENT DOCUMENTS

| | | |
|---|---|---|
| JP | 2004-3439 A | 1/2004 |
| JP | 2004-150304 A | 5/2004 |
| JP | 2007-177719 A | 7/2007 |
| JP | 2009-13845 A | 1/2009 |
| JP | 2009-47014 A | 3/2009 |
| JP | 2009-85070 A | 4/2009 |
| JP | 2011-12612 A | 1/2011 |
| JP | 2011-241794 A | 12/2011 |

OTHER PUBLICATIONS

Japanese-language Written Opinion (PCT/ISA/237) issued in PCT Application No. PCT/JP2015/053712 dated May 19, 2015 (five pages).
Extended European Search Report issued in counterpart European Application No. 15881941.7 dated Sep. 12, 2018 (nine (9) pages).
International Preliminary Report on Patentability (PCT/IB/338 and PCT/IB/373) issued in PCT Application No. PCT/JP2015/053712 dated Aug. 24, 2017 including English translation of document C2 (Japanese-language Written Opinion (PCT/ISA/237)) previously filed on Jul. 19, 2017 (nine (9) pages).

* cited by examiner

WORK MACHINE, POWER UNIT, AND DIESEL ENGINE OF WORK MACHINE

TECHNICAL FIELD

The present invention relates to a work machine such as a hydraulic excavator, a power unit used for the work machine, and a diesel engine of a work machine.

BACKGROUND ART

A work machine such as a hydraulic excavator includes a diesel engine as the prime mover and performs necessary work by driving at least one hydraulic pump with the diesel engine and driving one or more hydraulic actuators with hydraulic fluid delivered from the hydraulic pump. The diesel engine includes a fuel injection unit and controls an engine revolution speed and an output torque by controlling the fuel injection amount by using the fuel injection unit. In the diesel engine of a work machine, to enable various types of work, the output power is generally controlled in such a manner that the power can be outputted in a wide region in an engine revolution speed vs. output torque diagram including a full load characteristic in which the fuel injection amount reaches the maximum (Patent Document 1).

Incidentally, in diesel engines, regulations against the emission of noxious substances contained in the exhaust gas, such as nitrogen oxide (NOx) and particulate matter (PM), is becoming more and more strict in consideration of the influence on human bodies and environment. As methods for reducing these noxious substances, the following two types of methods are known:

(1) A method of improving combustion and thereby reducing the noxious substance emission itself from the engine.

(2) A method of providing a post-treatment device for the exhaust gas from the engine and thereby removing the noxious substances.

In regard to the method (1), there has been proposed, for example, the so-called low-temperature premixed combustion technology that lengthens an ignition delay period by delaying the injection time to a time point after the compression top dead center and improves the combustion by forming premixed gas in the ignition delay period through oxygen concentration reduction by EGR and gas flow control in the combustion chamber (Patent Documents 2 and 3). However, the premixed combustion has technological limitation and its use is limited to a region of low revolution speed and low engine load. In regions where the premixed combustion is unusable, there is no choice but to use diffusive combustion.

In regard to the method (2), there exist a technology of removing particulate matter by using a filter (Patent Document 4), a technology of removing nitrogen oxide by injecting an urea reducing agent or the like into the exhaust gas to cause a reaction (Patent Document 5), and so forth.

PRIOR ART DOCUMENTS

Patent Documents

Patent Document 1: JP-2007-177719-A
Patent Document 2: JP-2009-47014-A
Patent Document 3: JP-2009-085070-A
Patent Document 4: JP-2011-12612-A
Patent Document 5: JP-2009-13845-A

SUMMARY OF THE INVENTION

Problem to be Solved by the Invention

As described in Patent Document 1, the output power of a diesel engine of a work machine is generally controlled in such a manner that the power can be outputted in a wide region in the engine revolution speed vs. output torque diagram to enable various types of work. As a result, in cases of employing the technology of the method (1), that is, the low-temperature premixing technology described in Patent Documents 2 and 3, to reduce noxious substances, it becomes necessary to optimize the combustion in regard to the whole of the wide output power region. However, it is extremely difficult to optimize the combustion while achieving prescribed motive power performance in regard to the whole of the wide output power region. After all, the technology has a limitation in the noxious substance reduction effect.

On the other hand, employing the technology of the method (2), that is, adding a post-treatment device like the one described in Patent Document 4 or 5, makes the system complicated, and thus causes extra initial costs, maintenance and running costs. Especially, the method using an urea reducing agent further has a problem regarding the installation positions of components such as an urea tank and a problem regarding the storage technology for preventing the trouble of adding the urea reducing agent and degradation of the urea reducing agent in relatively small-sized work machines.

The object of the present invention is to provide a work machine, a power unit and a diesel engine of a work machine that make it possible to reduce the emitted noxious substances to levels below reference values stipulated by exhaust gas regulations in advanced countries and regions while also omitting or simplifying the post-treatment device.

Means for Solving the Problem

To achieve the above-described object, the present invention provides a work machine including a diesel engine, at least one hydraulic pump driven by the diesel engine, and at least one hydraulic actuator driven by hydraulic fluid delivered from the hydraulic pump. The diesel engine is an engine that limits maximum output torque of the diesel engine in a second revolution speed region lower than a first revolution speed region including a rated revolution speed in such a manner that the maximum output torque has a characteristic of intermediate torque lower than a torque of a maximum output horsepower point at the rated revolution speed.

By performing output limitation in the second revolution speed region lower than the first revolution speed region including the rated revolution speed in such a manner that the maximum output torque of the diesel engine has a characteristic of intermediate torque lower than the torque of the maximum output horsepower point at the rated revolution speed as above, the torque output region in the engine revolution speed vs. output torque diagram is made narrower than in the conventional technology, and thus the employment of the combustion optimization technology becomes easier and the reduction of noxious substances contained in the exhaust gas is facilitated. For example, it is possible to employ a combustion improvement method such as the premixed combustion in a region in the second revolution speed region for outputting low torque and to employ the diffusive combustion while optimizing combustion to a diffusive combustion condition in a high torque region as a small portion of the first revolution speed region used regularly. Further, since the torque output region becomes narrower and the number of routes (frequency) of the transition between the premixed combustion and the diffusive combustion decreases, the switching condition between the two types of combustion becomes simpler. With these features, the noxious substances contained in the exhaust gas can be reduced to levels below reference values stipulated by exhaust gas regulations in advanced countries and regions.

Here, preferable features of the present invention are as follows:

The maximum output torque limited in the second revolution speed region is lower than maximum torque that is outputted by the hydraulic pump when a target revolution speed of the diesel engine is set in the second revolution speed region and the work machine is about to be driven at the set revolution speed.

The maximum output torque limited in the second revolution speed region may be lower than or equal to 75% of torque of a maximum output torque point of the diesel engine.

The first revolution speed region includes a revolution speed of a maximum output torque point of the diesel engine, the revolution speed of the maximum output torque point is a revolution speed larger than or equal to 75% of the rated revolution speed, and the second revolution speed region is lower than the revolution speed of the maximum output torque point of the diesel engine.

The diesel engine includes a fuel injection unit and an electronic control unit for controlling the fuel injection unit, and the electronic control unit is configured to limit the maximum output torque by limiting a maximum value of an injection amount of fuel supplied from the fuel injection unit.

The diesel engine controls a fuel injection unit so as to carry out premixed combustion in the second revolution speed region.

The diesel engine controls a fuel injection unit so as to carry out premixed combustion on a low torque side in the first revolution speed region and carry out diffusive combustion on a high torque side in the first revolution speed region.

The diesel engine controls a revolution speed and torque by means of revolution speed control to adjust an actual revolution speed to a target revolution speed.

The diesel engine is equipped with at least one of a filter for removing particulate matter contained in exhaust gas and a catalyst.

The work machine further comprises an electric motor used in combination with the diesel engine to drive the hydraulic pump.

The work machine according to the present invention may further include a revolution speed instruction unit for setting a target revolution speed of the diesel engine and a control unit that instructs the target revolution speed set by the revolution speed instruction unit to the diesel engine when the target revolution speed set by the revolution speed instruction unit is in the second revolution speed region and the hydraulic actuator is not driven, and increases the target revolution speed to a revolution speed in the first revolution speed region and instructs the increased target revolution speed to the diesel engine when the target revolution speed set by the revolution speed instruction unit is in the second revolution speed region and the hydraulic actuator is driven.

With such features, even in cases where the maximum output torque of the diesel engine in the second revolution speed region lower than the first revolution speed region including the rated revolution speed is limited to a characteristic of intermediate torque as above, when the hydraulic actuator is driven and the load torque of the engine increases accordingly, the target revolution speed is increased by the control unit and the revolution speed instruction unit to a revolution speed in the first revolution speed region. Accordingly, the output torque of the engine is allowed to increase to required maximum torque higher than the maximum output torque limited in the second revolution speed region, output torque required of the work machine is obtained, and satisfactory operability can be secured.

The he hydraulic pump is a variable displacement type, and the control unit calculates a required maximum output horsepower at the target revolution speed set by the revolution speed instruction unit when the hydraulic actuator is driven and the target revolution speed is increased to a revolution speed in the first revolution speed region, and the control unit controls a maximum torque of the hydraulic pump in such a manner that an absorption horsepower of the hydraulic pump does not exceed the required maximum output horsepower, when the revolution speed of the diesel engine has increased to the first revolution speed region.

The control unit controls a maximum torque of the hydraulic pump in such a manner that an output torque of the diesel engine does not exceed the limited maximum output torque while the revolution speed of the diesel engine is in the second revolution speed region, when the hydraulic actuator is driven and the target revolution speed is increased to a revolution speed in the first revolution speed region.

Further, to achieve the above-described object, the present invention provides a power unit in which the diesel engine described above and the electric motor described above are integrated as a unit.

Further, the present invention provides the diesel engine of the work machine described above.

Effect of the Invention

According to the present invention, the emitted noxious substances can be reduced to levels below reference values stipulated by exhaust gas regulations in advanced countries and regions while also omitting or simplifying the post-treatment device.

MODES FOR CARRYING OUT THE INVENTION

Figure 1:
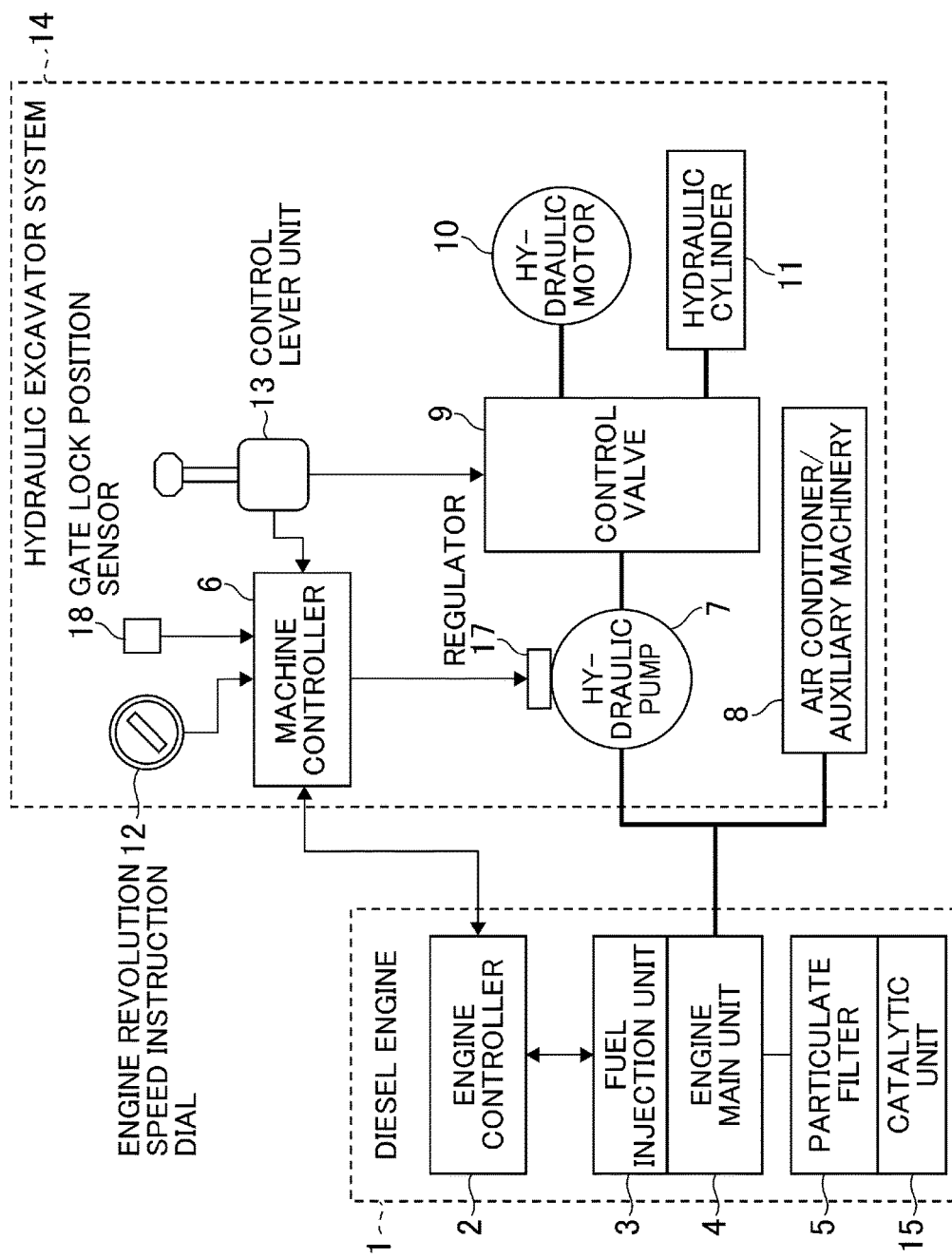
FIG. 1 is a diagram showing an overall system of a hydraulic excavator according to a first embodiment of the present invention.

Referring now to the drawings, a description will be given in detail of preferred embodiments in accordance with the present invention.

First Embodiment

—Overall System—

FIG. 1 is a diagram showing an overall system of a hydraulic excavator according to a first embodiment of the present invention.

In FIG. 1, the hydraulic excavator of this embodiment includes a diesel engine 1 and a hydraulic excavator system 14.

The diesel engine 1 includes an engine controller 2, a fuel injection unit 3, an engine main unit 4, a particulate filter 5 and a catalytic unit 15.

The hydraulic excavator system 14 includes a machine controller 6, at least one hydraulic pump 7, a regulator 17 for the hydraulic pump 7, air conditioner/auxiliary machinery 8, a control valve 9, a plurality of actuators including a hydraulic motor 10 and a hydraulic cylinder 11, an engine revolution speed instruction dial 12, a control lever unit 13, and an operation detection switch 18 of a gate lock lever (not shown).

The diesel engine 1, as a prime mover, drives the hydraulic pump 7 with the engine main unit 4 to drive the hydraulic actuators such as the hydraulic motor 10 and the hydraulic cylinder 11 with hydraulic fluid delivered from the hydraulic pump 7. According to inputs to the control lever unit 13, each spool valve in the control valve 9 is switched and the operation of the hydraulic actuators 10 and 11 is controlled. The engine main unit 4 drives not only the hydraulic power system driven by the hydraulic pump 7 but also the auxiliary machinery 8 such as the air conditioner, a gear pump (pilot pump) delivering hydraulic fluid for signals and a cooling fan at the same time.

The fuel injection unit 3 is installed in the engine main unit 4 and controls the fuel injection amount to control the engine revolution speed and the output torque. The fuel injection unit 3 is controlled by the engine controller 2.

Governors of the mechanical control type called mechanical governors used to be employed as control systems for fuel injection units 3. However, electronic fuel injection units performing the fuel injection according to commands from an engine controller 2 are currently used in clean diesel engines compatible with the recent strict exhaust gas regulations in advanced countries and regions.

The engine controller 2 controls not only the fuel injection unit 3, that is, the fuel injection amount and the injection timing, but also an unshown turbocharger, EGR, and so forth.

The turbocharger sends compressed air to the inside of the engine by rotating a turbine at a high speed with the exhaust gas and driving a centrifugal compressor with the turning force of the turbine. With the turbocharger, an air-fuel mixture exceeding the original displacement of the internal combustion engine is taken in and combusted. This increases thermal efficiency of the engine, improves fuel efficiency, and reduces noxious substances in the exhaust gas.

EGR (Exhaust Gas Recirculation) realizes the reduction of nitrogen oxide (NOx) in the exhaust gas and the improvement of fuel efficiency at times of partial loading by extracting part of the exhaust gas after the engine combustion and leading the extracted gas to the intake side to have the engine take in the gas again.

In the hydraulic excavator system 14, the engine revolution speed instruction dial 12 is a dial for setting a target revolution speed of the engine 1. An instruction signal from the engine revolution speed instruction dial 12 is inputted to the machine controller 6. According to the instruction signal, the machine controller 6 performs predetermined arithmetic processing as will be explained later, sets the target revolution speed of the engine 1, and outputs the set target revolution speed to the engine controller 2. Based on the target revolution speed, the engine controller 2 calculates a target injection amount and thereby controls the fuel injection unit 3. Further, the machine controller 6 performs predetermined arithmetic processing as will be explained later, outputs a torque signal to the regulator 17, and performs maximum torque control of the hydraulic pump 7.

—Work Machine—

Figure 2:
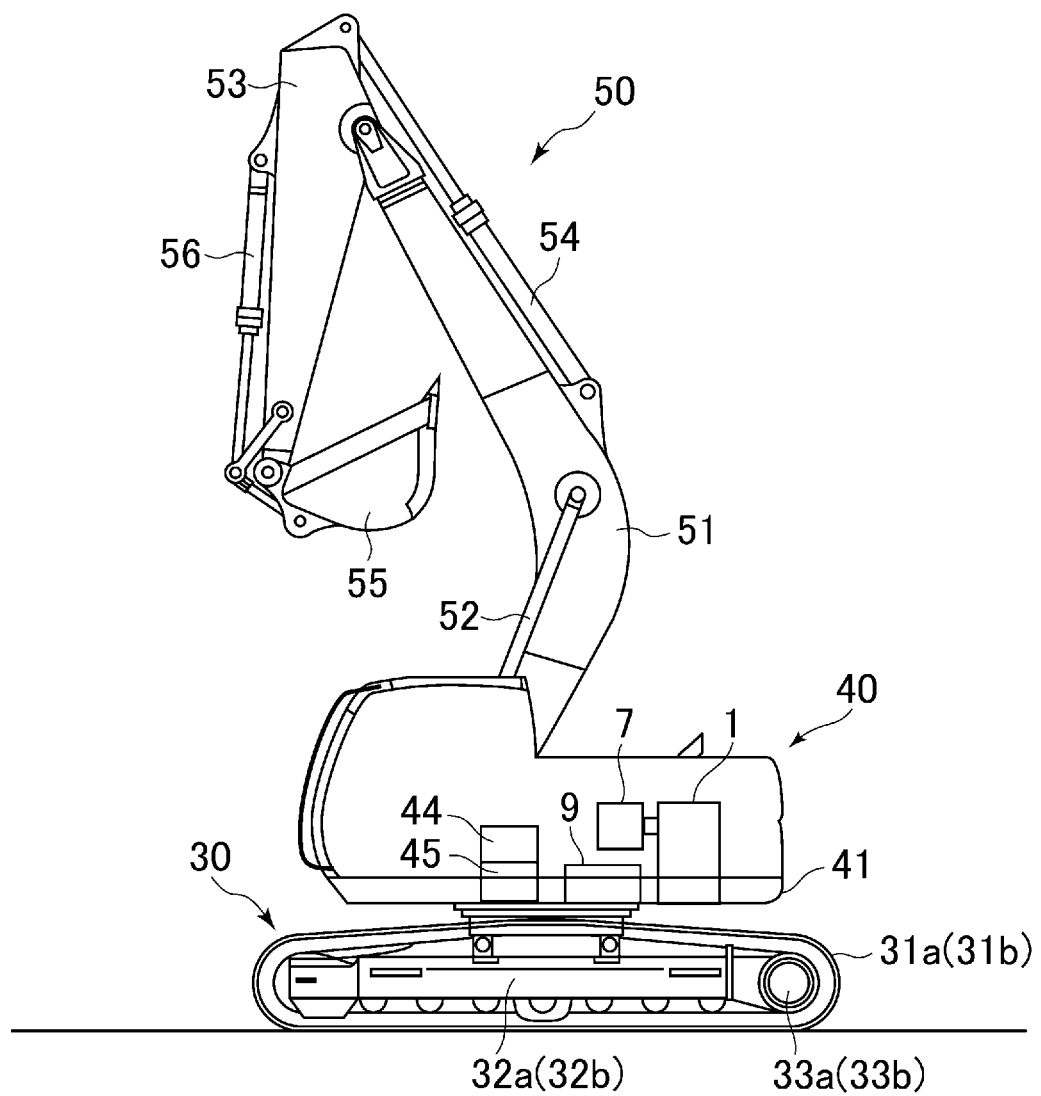
FIG. 2 is a diagram showing the configuration of a hydraulic excavator as an example of a work machine equipped with the system according to the present invention.

FIG. 2 is a diagram showing the configuration of a hydraulic excavator as an example of a work machine equipped with the system according to the present invention.

In FIG. 2, the hydraulic excavator includes a lower track structure 30, an upper swing structure 40 and an excavation mechanism 50. The lower track structure 30 includes a pair of crawlers 31a and 31b (only one side is illustrated), a pair of crawler frames 32a and 32b (only one side is illustrated), a pair of travel hydraulic motors 33a and 33b (only one side is illustrated) each of which independently drives and controls its respective crawler, their deceleration mechanisms (not shown), and so forth.

The upper swing structure 40 includes a swing frame 41. Mounted on the swing frame 41 are the aforementioned diesel engine 1, the hydraulic pump 7 driven by the diesel engine 1, the control valve 9, a swing hydraulic motor 44, a decelerator 45, and so forth. A swing mechanism (not shown) including a swing ring is provided between the lower track structure 30 and the upper swing structure 40. The decelerator 45 decelerates the rotation of the swing hydraulic motor 44 and transmits the decelerated rotation to the swing mechanism. By the driving force of the swing hydraulic motor 44, the upper swing structure 40 is driven and swung with respect to the lower track structure 30.

The excavation mechanism 50 includes a vertically movable boom 51 rotatably supported by a shaft on the upper swing structure 40, a boom cylinder 52 for driving the boom 51, an arm 53 rotatably supported by a shaft in the vicinity of the tip end of the boom 51, an arm cylinder 54 for driving the arm 53, a bucket 55 rotatably supported by a shaft at the tip end of the arm 53, and a bucket cylinder 56 for driving the bucket 55. The actuators (the travel hydraulic motors 33a and 33b, the boom cylinder 52, the arm cylinder 54, the bucket cylinder 56 and the swing hydraulic motor 44) are driven by the hydraulic fluid supplied from the hydraulic pump 7. The driving direction and the driving speed of each actuator is controlled by operating a corresponding spool valve in the control valve 9.

The hydraulic motor 10 shown in FIG. 1 represents the left and right travel motors 33a and 33b and the swing hydraulic motor 44. The hydraulic cylinder 11 represents the boom cylinder 52, the arm cylinder 54, the bucket cylinder 56, etc.

—Control of Diesel Engine 1—

Figure 3:
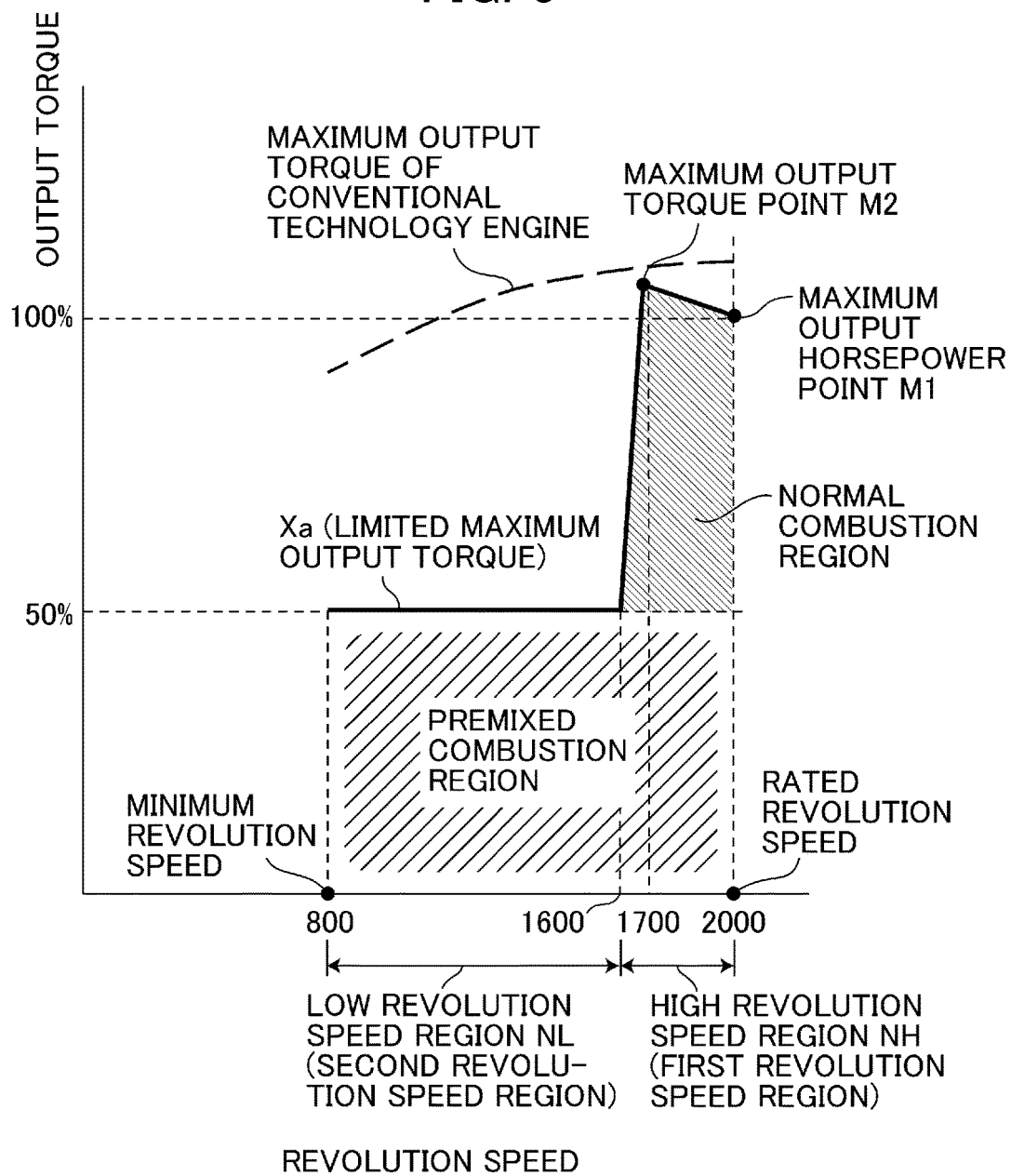
FIG. 3 is a diagram showing a maximum output torque diagram (engine revolution speed vs. output torque diagram) of an engine in the first embodiment of the present invention.

FIG. 3 is a diagram showing an example of a maximum output torque diagram (engine revolution speed vs. output torque diagram) of the engine 1 obtained by output limitation control by the engine controller 2.

The engine controller 2 minutely controls various operating conditions of fuel injection, turbocharger, EGR, etc. so as to achieve optimum operating conditions from the viewpoint of not only constantly realizing stable operation, i.e., stable shaft torque output, but also reducing fuel consumption and noxious substances in the exhaust gas in the wide range of torque revolution speed conditions of the operation of the engine 1 and load conditions changing also dynamically. Since the engine controller 2 is in charge of controlling a huge number of control targets of various devices in various operating conditions as above, their trade-off occurs in operating conditions. Therefore, simplifying the operating conditions of the engine first is effective for reducing the noxious substances contained in the exhaust gas.

Further, while an ordinary type of diesel engine in the fuel injection process injects the fuel at a time point in the vicinity of the compression top dead center and burns the injected fuel in the middle of injection by means of self ignition, the emission of noxious substances in the low torque and low revolution speed region can be reduced by using the so-called low-temperature premixed combustion technology that lengthens the ignition delay period by delaying the injection time to a time point after the compression top dead center and improves the combustion by forming premixed gas in the ignition delay period through oxygen concentration reduction by EGR and gas flow control in the combustion chamber.

However, the fuel injection amount increases on the high load side and the time of one stroke shortens on the high revolution speed side, and thus it becomes difficult to obtain the effect of the premixing. Although there is no choice but to use diffusive combustion in regions where premixed combustion is unusable, a trade-off occurs between the reduction of nitrogen oxide (NOx) and the reduction of particulate matter (PM) and its is difficult to reduce both types of noxious substances to or below regulatory levels. Further, there is another problem in that the exhaust gas increases at times of switching between diffusive combustion and premixed combustion.

Therefore, in this embodiment, the maximum output torque diagram (engine revolution speed vs. output torque diagram) of the diesel engine 1 is set like the solid lines in FIG. 3, for example.

Referring to FIG. 3, in this embodiment, in consideration of the above-described characteristics of the diesel engine and various exhaust gas reduction technologies, high torque is outputted only in a high revolution speed region NH (first revolution speed region) in the vicinity of the rated revolution speed having a maximum output horsepower point M1, and the maximum output torque of the diesel engine 1 is limited in a low revolution speed region NL (second revolution speed region) to have a characteristic Xa of intermediate torque lower than the torque of the maximum output horsepower point M1 at the rated revolution speed (2000 rpm). The limited maximum output torque is lower than maximum torque (Tr in FIG. 5) that is required of the hydraulic pump 7 when the target revolution speed of the diesel engine 1 is set in the low revolution speed region NL (second revolution speed region) in a hydraulic excavator according to the conventional technology. For example, the limited maximum output torque is set at a 50% torque value with respect to the torque of the maximum output horsepower point M1. The limitation of the maximum output torque is carried out by the engine controller 2 by limiting the maximum value of the fuel injection amount of the fuel injection unit 3.

The limited torque value in the low revolution speed region NL having the characteristic Xa is desired to be low from the viewpoint of the exhaust gas reduction effect. However, the limited torque value has to be determined in consideration of the load on the air conditioner and auxiliary machinery 8, the load on a hydraulic circuit 9 in a state with no load on the actuators 10 and 11 (especially at times of low temperature when viscosity of the hydraulic fluid is high), and so forth, and has to be at least higher than load torque that acts on the engine in a state with no work, that is, with no particular load on the hydraulic pump 7, the hydraulic actuator 10 or the hydraulic actuator 11, namely, the drag torque of the hydraulic pump 7 and the engine main unit 4 itself. Further, to obtain a sufficient exhaust gas reduction effect, the limited torque value is desired to be lower than or equal to 75% of the maximum output torque at most (M2 in FIG. 5).

The exhaust gas regulation of the diesel engine 1 is evaluated as performance of the diesel engine 1 alone including the engine controller 2. Thus, it is essential to carry out the torque output limitation not as limitation by the machine controller 6 on the hydraulic excavator's side but as limitation by the engine controller 2 and implement the characteristic like the solid lines in FIG. 3 purely by the diesel engine 1 alone as described above.

Further, as shown in FIG. 3, the engine controller 2 performs the control so as to carry out the low-temperature premixed combustion on the low torque side of the low revolution speed region NL and the diffusive combustion in a limited region of high torque and high revolution speed in the high revolution speed region NH. This not only narrows the operating region where the engine outputs power but also increases the ratio of the region where the premixed combustion is usable. Further, the number of routes (frequency) of the transition between the premixed combustion and the diffusive combustion decreases. Accordingly, the switching condition between the premixed combustion and the diffusive combustion becomes simpler and the noxious substances contained in the exhaust gas can be reduced to levels below reference values stipulated by exhaust gas regulations in advanced countries and regions. Incidentally, while the method of operating the engine by switching between the premixed combustion and the diffusive combustion as above is effective, there can also be cases where only the premixed combustion or the diffusive combustion is performed depending on specifications of the engine or the target value of the exhaust gas reduction.

Furthermore, to effectively reduce the noxious substances in the exhaust gas, it is desirable to set the upper limit of the low revolution speed region NL higher than 75% of the rated revolution speed so that an intermediate revolution speed is included in the low revolution speed region NL where the torque output is limited, and to set the revolution speed of the maximum output torque point M2 higher than 75% of the rated revolution speed. With these settings, the use of the engine in the torque/revolution speed region with high emission of noxious substances can be limited.

As above, the high revolution speed region NH (first revolution speed region) includes the revolution speed of the maximum output torque point M2 of the diesel engine 1, the revolution speed of the maximum output torque point M2 is a revolution speed larger than or equal to 75% of the rated revolution speed, and the low revolution speed region NL (second revolution speed region) is set to be lower than the revolution speed of the maximum output torque point M2 of the diesel engine 1. To meet these conditions, in the embodiment with the engine characteristic shown in FIG. 3, the maximum output torque revolution speed is set at 1700 rpm (85%) with respect to the rated revolution speed 2000 rpm, and the upper limit of the 50% torque output range (low revolution speed region NL) is set at 1600 rpm (80%).

By configuring the diesel engine 1 as an engine that limits the maximum output torque of the diesel engine 1 in the low revolution speed region NL (second revolution speed region) in such a manner that the maximum output torque has the characteristic Xa of intermediate torque lower than the torque of the maximum output horsepower point M1 at the rated revolution speed (2000 rpm) as described above, the torque output region in the engine revolution speed vs. output torque diagram is made narrower than in the conventional technology, and thus the employment of the combustion optimization technology in the engine controller 2 becomes easier and the noxious substances in the exhaust gas can be reduced significantly. In cases where the regulatory levels are exceeded even if the noxious substances are reduced by the technology of the present invention, noxious gases and particulate matter (PM) may be removed by using the catalytic unit 15 and the particulate filter 5 as relatively simple post-treatment devices.

The diesel engine 1 having the characteristic indicated by the solid lines in FIG. 3 is inferior in convenience and general versatility of the engine to conventional diesel engines capable of outputting high torque in the entire revolution speed range. However, by adapting the system 14 on the work machine's side to this characteristic as will be explained later, the maximum output torque itself required of the diesel engine 1 is secured and thus the hydraulic excavator can be operated while significantly reducing the exhaust gas. For this purpose, in this embodiment, an engine performing revolution speed control (isochronous revolution speed control, droop revolution speed control, reverse droop revolution speed control, or the like) of controlling the fuel injection amount to adjust the actual revolution speed to a target revolution speed is employed as the diesel engine 1.

—Control on Hydraulic Excavator System 14's Side—

——Idea——

Next, the control of the hydraulic excavator system 14 in a case where the diesel engine 1 according to the present invention is used will be described below.

To operate the hydraulic excavator with the torque characteristic of the engine 1 shown in FIG. 3, a hydraulic pump of the variable displacement type is employed as the hydraulic pump 7, and an engine performing the revolution speed control (isochronous revolution speed control, droop revolution speed control, reverse droop revolution speed control, or the like) is employed as the diesel engine 1 as mentioned above.

Further, in the hydraulic excavator, pump torque control is performed on the hydraulic pump 7 rotationally driven by the diesel engine 1 in order to prevent excessive load on the engine. The pump torque control is control for preventing the maximum torque of the hydraulic pump 7 from exceeding the maximum output torque of the diesel engine 1 at the revolution speed by decreasing the displacement volume of the hydraulic pump 7 according to the increase in the load pressure of the hydraulic pump 7.

In the diesel engine 1 according to the present invention, the maximum output torque in the low revolution speed region NL (second revolution speed region) is limited in contrast to the ordinary type of diesel engines as shown in FIG. 3. Thus, in the low revolution speed region NL, the maximum torque of the hydraulic pump 7 has to be controlled not to exceed the limited maximum output torque of the engine 1 at the revolution speed by decreasing the displacement volume of the hydraulic pump 7. However, since the maximum output torque is low, leaving the engine revolution speed at a low speed results in significantly low output power in the combination with the engine 1 according to the present invention.

Therefore, in this embodiment, the maximum torque of the hydraulic pump 7 is controlled by controlling the regulator 17 according to a signal from the machine controller 6 in such a manner that the absorption torque (hydraulic load) of the hydraulic pump 7 does not exceed the limited maximum output torque of the engine 1 having the characteristic Xa while the revolution speed of the engine 1 is in the low revolution speed region NL. The technology for controlling the maximum torque of the hydraulic pump is publicly known and described in JP-2007-177719-A, for example.

Further, in cases where the target revolution speed is set in the low revolution speed region NL with the engine revolution speed instruction dial 12, when a workload is placed on the engine 1, the machine controller 6 increases the target revolution speed to the high revolution speed region NH for high torque output so as to be able to obtain output horsepower equal to the output horsepower (e.g., point B in FIG. 5) that should be outputted by the ordinary type of diesel engine at the set target revolution speed (e.g., 1400 rpm) and issues an instruction representing the increased target revolution speed to the engine 1. Furthermore, the machine controller 6 controls the hydraulic pump 7 in such a manner that the point of the output horsepower at the increased target revolution speed (e.g., point C1 in FIG. 5) becomes a maximum output horsepower point. This control is achieved by calculating the output horsepower (required maximum output horsepower) equal to the output horsepower that should be outputted at the set target revolution speed (e.g., the point B in FIG. 5) and controlling the maximum torque of the hydraulic pump 7 in such a manner that the maximum absorption horsepower (hydraulic load) of the hydraulic pump 7 does not exceed the required maximum output horsepower.

——Control Flow——

Figure 4:
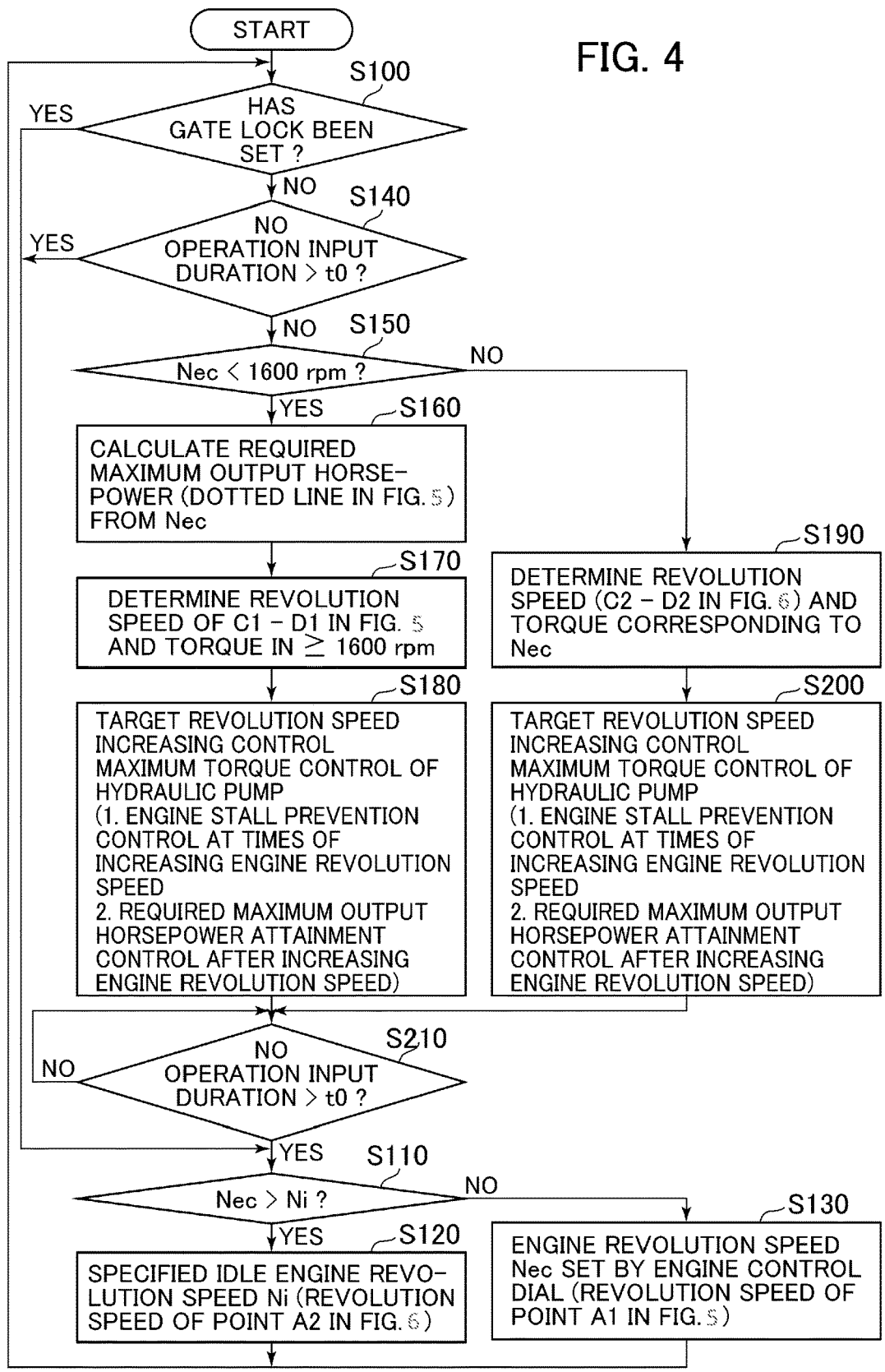
FIG. 4 is a control flow chart showing a control process of a machine controller realizing maximum torque control of a hydraulic pump and target revolution speed increasing control.
Figure 6:
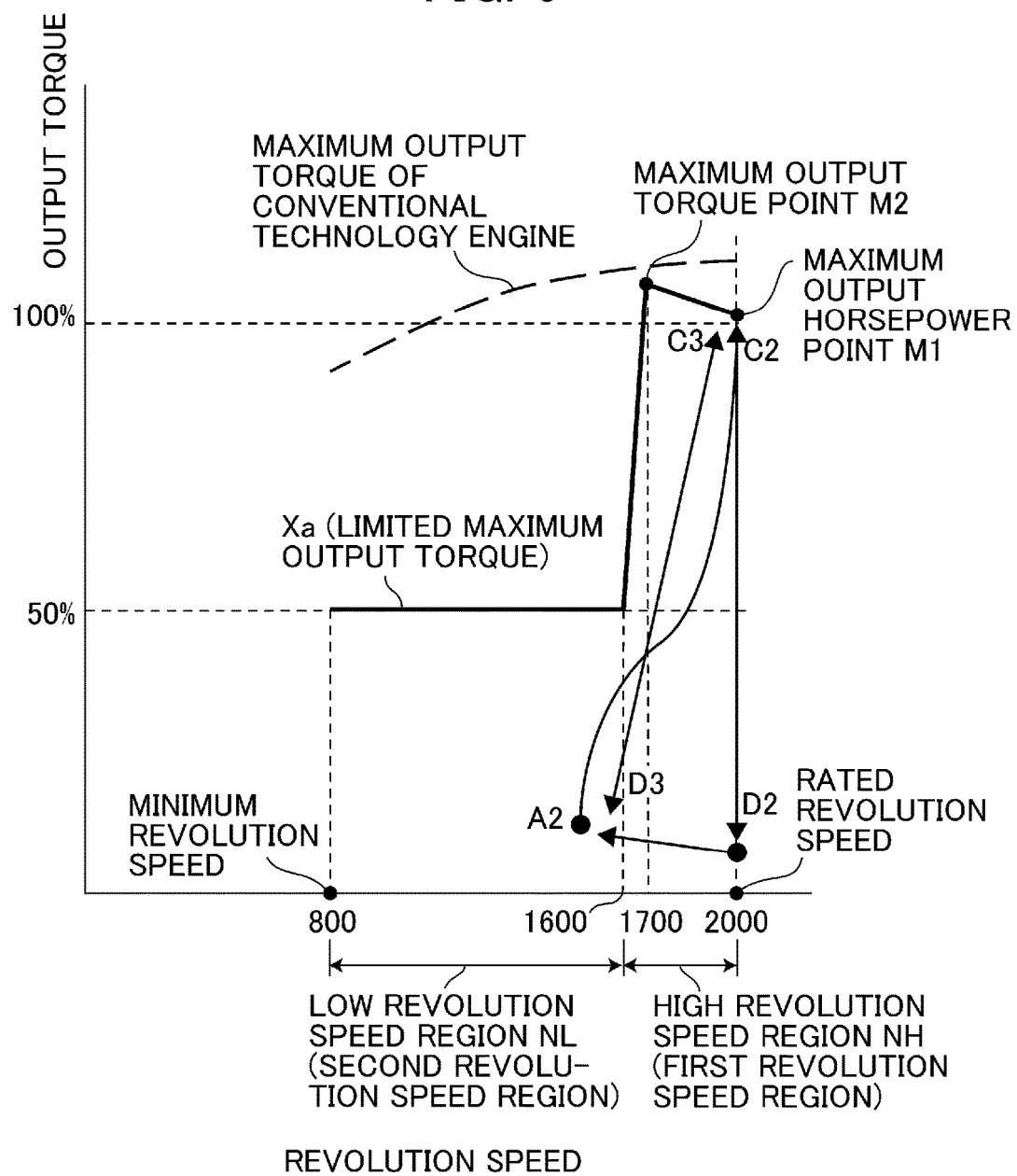
FIG. 6 is a diagram showing an example of the operation of the system in a case where the target revolution speed has been set at the maximum with the engine revolution speed instruction dial.

FIG. 4 is a control flow chart showing a control process of the machine controller 6 realizing such maximum torque control of the hydraulic pump 7 and the target revolution speed increasing control. In FIG. 4, Ni, Nec and t0 have the following meanings:

Ni: specified idle revolution speed for auto-idle control (e.g., revolution speed of point A2 in FIG. 6)

Figure 5:
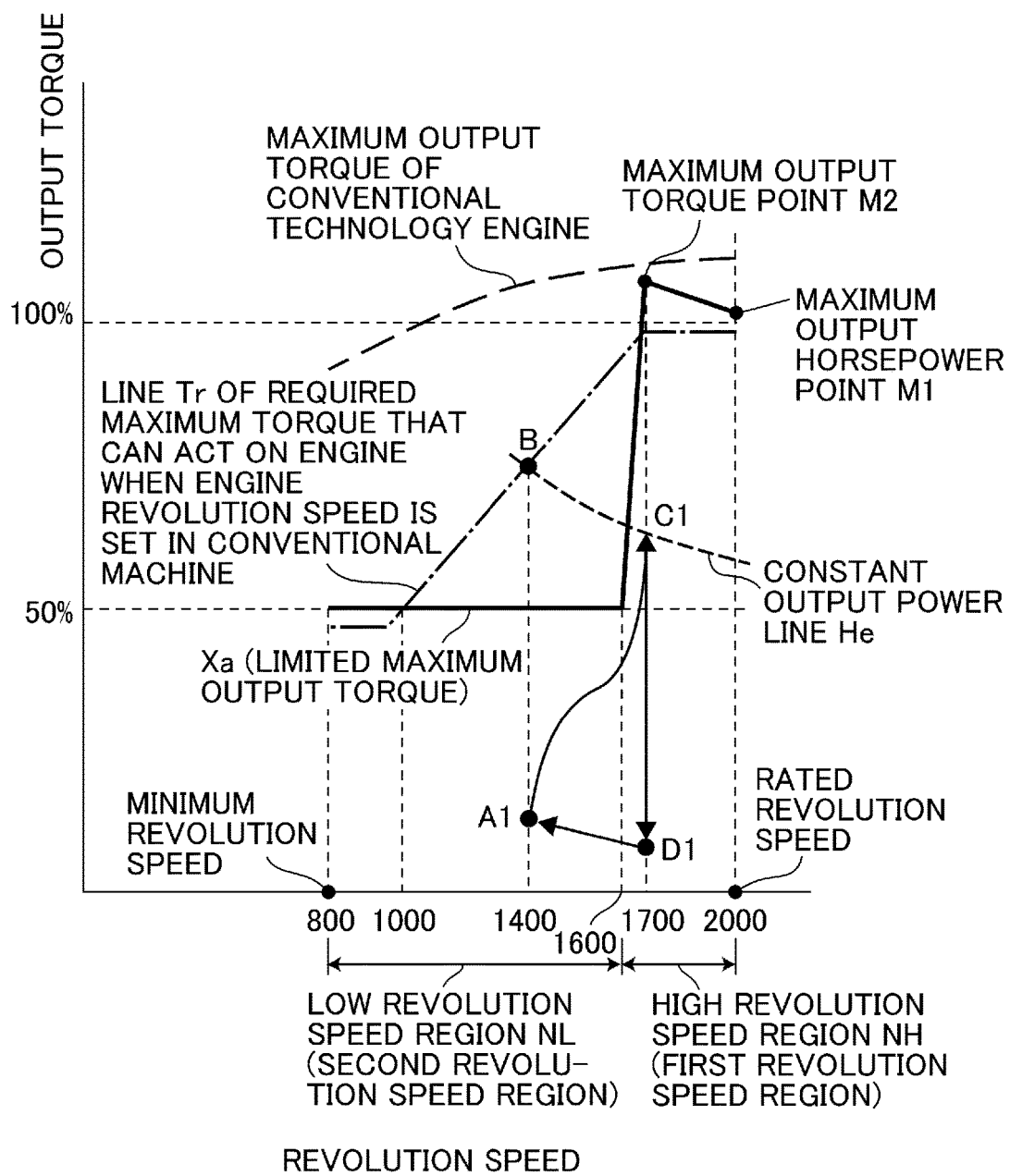
FIG. 5 is a diagram showing an example of the operation of the system in a case where a target revolution speed has been set at 1400 rpm in a low revolution speed region NL with an engine revolution speed instruction dial.

Nec: set revolution speed of the engine revolution speed instruction dial 12 (e.g., revolution speed of point A1 in FIG. 5 or C2 to D2 in FIG. 6)

t0: set value of a no operation input duration time to be used for lowering the engine revolution speed when the control lever unit 13 is not operated In FIG. 4, the machine controller 6 first receives a signal from the operation detection switch 18 of the gate lock lever (not shown) and judges whether or not the gate lock has been set (step S100).

Here, the gate lock lever is a lever arranged on the seat entry side of the cab seat, increased to open a channel when the work with the hydraulic excavator is interrupted or ended, and lowered to close the channel when the work is restarted or started. When the gate lock lever is increased, a lock valve is switched to a lock position to establish communication between a primary pressure port of a pilot valve of the control lever unit 13 and a tank. With this setting, even if the control lever unit 13 is operated, the control valve in the hydraulic circuit does not operate and the hydraulic actuators remain inoperable. This state is referred to as gate lock.

The operation detection switch 18 detects the increasing and lowering of the gate lock lever, and the machine controller 6 judges whether the gate lock lever has been increased (the gate lock has been set) or not based on the signal from the operation detection switch 18.

If the gate lock has been set, the machine controller 6 further judges whether or not the revolution speed Nec set by the engine revolution speed instruction dial 12 is higher than the specified idle revolution speed Ni for the auto-idle control (step S110). If Nec is higher than Ni, the specified idle revolution speed Ni is set as the target revolution speed (step S110→S120). If Nec is lower than or equal to Ni, the revolution speed Nec set by the engine revolution speed instruction dial 12 is set as the target revolution speed (step S110→S130).

Even when the gate lock is judged to have been released by lowering the gate lock lever, the machine controller 6 judges whether or not the no operation input state of the control lever unit 13 has continued for a predetermined time t0 (S140). If the no operation input state has continued for the predetermined time t0, the machine controller 6 similarly judges whether Nec>Ni or not and sets the specified idle revolution speed Ni or the revolution speed Nec set by the engine revolution speed instruction dial 12 as the target revolution speed (step S140 or S210→S110→S120 or S130). The machine controller 6 receives a detection signal of the operating pilot pressure of the control lever unit 13, and judges that the control lever unit 13 is in the no operation input state if the signal is lower than or equal to a threshold value.

If the no operation input state has not continued for the predetermined time t0 in S140, the machine controller 6 judges whether the revolution speed Nec set by the engine revolution speed instruction dial 12 is in the low revolution speed region NL (second revolution speed region) or not based on whether Nec is lower than 1600 rpm or not, for example (step S150). If Nec<1600 rpm holds, the machine controller 6 calculates the required maximum output horsepower (constant output power line He in FIG. 5) at Nec from Nec (step S160), and determines a new target revolution speed (e.g., revolution speed of C1 to D1 in FIG. 5) and required maximum torque (e.g., torque of the point C1 in FIG. 5) in the high revolution speed region NH (first revolution speed region) higher than or equal to 1600 rpm based on the required maximum output horsepower (step S170). Subsequently, the machine controller 6 performs the target revolution speed increasing control for increasing the engine revolution speed by outputting the determined target revolution speed to the engine controller 2 (step S180). Concurrently, the machine controller 6 performs the maximum torque control of the hydraulic pump 7. This maximum torque control includes engine stall prevention control at times of increasing the engine revolution speed, performed while the engine revolution speed is lower than 1600 rpm, and required maximum output horsepower attainment control after increasing the engine revolution speed.

To sum up, while the engine revolution speed increased by the target revolution speed increasing control is lower than 1600 rpm (while the revolution speed of the diesel engine 1 is in the low revolution speed region NL), the machine controller 6 prevents the stall of the diesel engine 1 by controlling the maximum torque of the hydraulic pump 7 in such a manner that the output torque of the engine 1 does not exceed the limited maximum output torque having the characteristic Xa. When the revolution speed has increased to or above 1600 rpm (when the revolution speed of the diesel engine 1 has increased to the high revolution speed region NH), the machine controller 6 outputs a torque signal corresponding to the required maximum torque determined in the step S170 (e.g., the torque of the point C1 in FIG. 5) to the regulator 17 of the hydraulic pump 7 and thereby controls the maximum torque of the hydraulic pump 7 in such a manner that the absorption horsepower (hydraulic load) of the hydraulic pump 7 does not exceed the required maximum output horsepower (dotted line in FIG. 5) at Nec (step S180).

If Nec≥1600 rpm holds and Nec is in the high revolution speed region NH (first revolution speed region) in the step S150, the machine controller 6 determines the revolution speed (e.g., C2 to D2 in FIG. 6) and the maximum output torque (e.g., the torque of the point M1 in FIG. 6) corresponding to Nec as the target revolution speed and the required maximum torque (step S190). Subsequently, the machine controller 6 performs the target revolution speed increasing control for increasing the engine revolution speed by outputting the determined target revolution speed to the engine controller 2 (step S200). Concurrently, the machine controller 6 performs the maximum torque control of the hydraulic pump 7. Similarly to the step S180, this maximum torque control includes the engine stall prevention control at times of increasing the engine revolution speed, performed while the engine revolution speed is lower than 1600 rpm, and the required maximum output horsepower attainment control after increasing the engine revolution speed. The details of these controls are substantially identical to those in the explanation of the step S180 except that the target revolution speed before being increased is the specified idle revolution speed Ni for the auto-idle control that has been set in the step S120.

As above, in the step S180 or S200, when the target revolution speed Nec set by the engine revolution speed instruction dial 12 is in the low revolution speed region NL (second revolution speed region) and the hydraulic actuators 10 and 11 are not driven, the machine controller 6 issues an instruction representing the target revolution speed Nec set by the engine revolution speed instruction dial 12 to the diesel engine 1. When the target revolution speed Nec set by the engine revolution speed instruction dial 12 is in the low revolution speed region NL (second revolution speed region) and the hydraulic actuators 10 and 11 are driven, the machine controller 6 increases the target revolution speed to a revolution speed in the high revolution speed region NH (first revolution speed region) and issues an instruction representing the increased target revolution speed to the diesel engine 1.

Further, in the steps S160 to S180, when the hydraulic actuators 10 and 11 are driven and the target revolution speed is increased to a revolution speed in the high revolution speed region NH (first revolution speed region), the machine controller 6 calculates the required maximum output horsepower at the target revolution speed set by the engine revolution speed instruction dial 12 and controls the maximum torque of the hydraulic pump 7 in such a manner that the absorption horsepower of the hydraulic pump 7 does not exceed the required maximum output horsepower when the revolution speed of the diesel engine 1 has increased to the high revolution speed region NH.

Furthermore, in the steps S180 and S200, when the hydraulic actuators 10 and 11 are driven and the target revolution speed is increased to a revolution speed in the high revolution speed region NH (first revolution speed region), the machine controller 6 controls the maximum torque of the hydraulic pump 7 in such a manner that the output torque of the diesel engine 1 does not exceed the limited maximum output torque while the revolution speed of the diesel engine 1 is in the low revolution speed region NL (second revolution speed region).

—Operation Examples—

Next, examples of the operation of the system will be described below with reference to FIGS. 4, 5 and 6.

FIG. 5 shows an example of the operation of the system in a case where the target revolution speed has been set at 1400 rpm in the low revolution speed region NL with the engine revolution speed instruction dial 12. FIG. 6 shows an example of the operation of the system in a case where the target revolution speed has been set at the maximum with the engine revolution speed instruction dial 12.

First, the case where the target revolution speed has been set at 1400 rpm with the engine revolution speed instruction dial 12 will be explained below.

The revolution speed of the diesel engine of an ordinary type of hydraulic excavator is set by the engine revolution speed instruction dial 12. In FIG. 5, a line Tr of maximum torque (required maximum torque) that can act on the diesel engine at each engine revolution speed when the engine revolution speed is set in a conventional machine is indicated by a chain line. This torque is the maximum torque required of the hydraulic pump 7 when the target revolution speed of the diesel engine 1 is set in the low revolution speed region NL and takes on values according to and lower than the maximum output torque that can be outputted by the conventional diesel engine indicated by the dotted line. In the present invention, the maximum output torque limited by the intermediate torque characteristic Xa in the low revolution speed region NL is lower than the required maximum torque. Therefore, if the same maximum torque as in the conventional machine acts on the engine 1 of the present invention in the low revolution speed region NL between 1000 rpm and 1600 rpm, the engine stalls due to insufficiency of torque.

Here, the engine revolution speed setting is used mainly for two purposes: lowering the engine noise during the idling and limiting the maximum output horsepower. Thus, in the present invention, when a workload is placed on the engine in the case where the idle revolution speed has been set at 1400 rpm with the engine revolution speed instruction dial 12, for example, the machine controller 6 increases the target revolution speed to the high revolution speed region NH for high torque output so as to be able to obtain the output horsepower equal to the output horsepower (the point B) that should be outputted by the ordinary type of diesel engine at times of 1400 rpm, outputs the target revolution speed to the engine controller 2, and makes the engine operate in such a manner that the point of the output horsepower at the increased target revolution speed (the point C1) becomes a maximum output horsepower point (step S100→S140→S150 to S180 in FIG. 4). In this case, in conjunction with the revolution speed control of the engine, the machine controller 6 controls the displacement volume of the variable displacement hydraulic pump 7 at the same time and leads the operating point to the point C1 as the maximum output power point in the case of the maximum load (required maximum output horsepower attainment control) while preventing the hydraulic load from exceeding the limited maximum output torque of the engine indicated by Xa (engine stall prevention control) and securing required responsiveness of the actuators.

During the work with the excavator, the engine is controlled by constant-speed control (isochronous control) and operates at points C1 to D1 due to hydraulic load fluctuation. After the work is interrupted and the control lever unit is returned to its neutral position, when the state with no load (the point D1) continues for a certain time, the machine controller 6 lowers the engine revolution speed and returns the revolution speed to the original revolution speed (the point A1) (step S210→S110→S120 in FIG. 4). Incidentally, while the points C1 and D1 are at 1700 rpm in FIG. 5, the points C1 and D1 may also be at other revolution speeds as long as the revolution speeds are between 1600 rpm and 2000 rpm.

Next, the case where the target revolution speed has been set at the maximum 2000 rpm with the engine revolution speed instruction dial 12 will be explained below.

Referring to FIG. 6, in the case where the target revolution speed has been set at the maximum with the engine revolution speed instruction dial 12, the machine controller 6 outputs the target revolution speed to the engine controller 2, and the engine 1 operates in the vicinity of the rated revolution speed 2000 rpm (point C2 to point D2) where the maximum output power can be outputted (step S150→S190→S200 in FIG. 4). Even in the case where the dial 12 is set at the maximum, when the neutral lever position continues, the machine controller 6 with the auto-idle function performs the control so as to lower the engine revolution speed to the auto-idle revolution speed (the point A2) for saving energy and reducing noise (step S210→S110→S120 in FIG. 4). In the case where the engine is at the auto-idle revolution speed, when there is an input to the control lever unit 13 and the maximum workload is placed on the engine, the machine controller 6 increases the engine revolution speed to a point (the point C2) in the vicinity of the maximum output horsepower point similarly to the case of the 1400 rpm setting shown in FIG. 5 (step S100→S140→S150→S190→S200). In this case, in conjunction with the revolution speed control of the diesel engine 1, the machine controller 6 controls the displacement volume of the variable displacement hydraulic pump 7 at the same time and leads the operating point to the point C2 as the maximum output power point in the case of the maximum load (required maximum output horsepower attainment control) while preventing the hydraulic load from exceeding the limited maximum output torque of the engine indicated by Xa (engine stall prevention control) and securing required responsiveness of the actuators.

Incidentally, the operation of the work machine according to the present invention is not limited to the constant-speed control (isochronous control) and the engine revolution speed may also be varied by, for example, giving a reverse droop characteristic to the engine or employing another method (points C3 to D3).

As described above, in this embodiment, by configuring the diesel engine 1 as an engine that limits the maximum output torque of the diesel engine 1 in the low revolution speed region NL (second revolution speed region) in such a manner that the maximum output torque has the characteristic Xa of intermediate torque lower than the torque of the maximum output horsepower point M1 at the rated revolution speed (2000 rpm), the torque output region in the engine revolution speed vs. output torque diagram is made narrower than in the conventional technology, and thus the employment of the combustion optimization technology in the engine controller 2 becomes easier and the reduction of noxious substances contained in the exhaust gas is facilitated. For example, it is possible to employ a combustion improvement method such as the premixed combustion in a region in the low revolution speed region NL for outputting low torque lower than or equal to the limited maximum output torque (intermediate torque) and to employ the diffusive combustion while optimizing combustion to a diffusive combustion condition in a high torque region as a small portion of the high revolution speed region NH used regularly. Further, since the torque output region becomes narrower and the number of routes (frequency) of the transition between the premixed combustion and the diffusive combustion decreases, the switching condition between the two types of combustion becomes simpler. With these features, the noxious substances contained in the exhaust gas can be reduced to levels below reference values stipulated by exhaust gas regulations in advanced countries and regions.

Furthermore, even in cases where the maximum output torque of the diesel engine in the low revolution speed region NL is limited to an intermediate torque value as above, when a hydraulic actuator is driven and the load torque of the engine 1 increases accordingly, the target revolution speed rises to a revolution speed in the high revolution speed region NH. Accordingly, the output torque of the engine 1 is allowed to increase to the required maximum torque higher than the limited maximum output torque (intermediate torque value), output torque required of the work machine is obtained, and satisfactory operability can be secured.

Second Embodiment

Next, a system of a work machine according to a second embodiment of the present invention will be described below with reference to FIG. 7.

Figure 7:
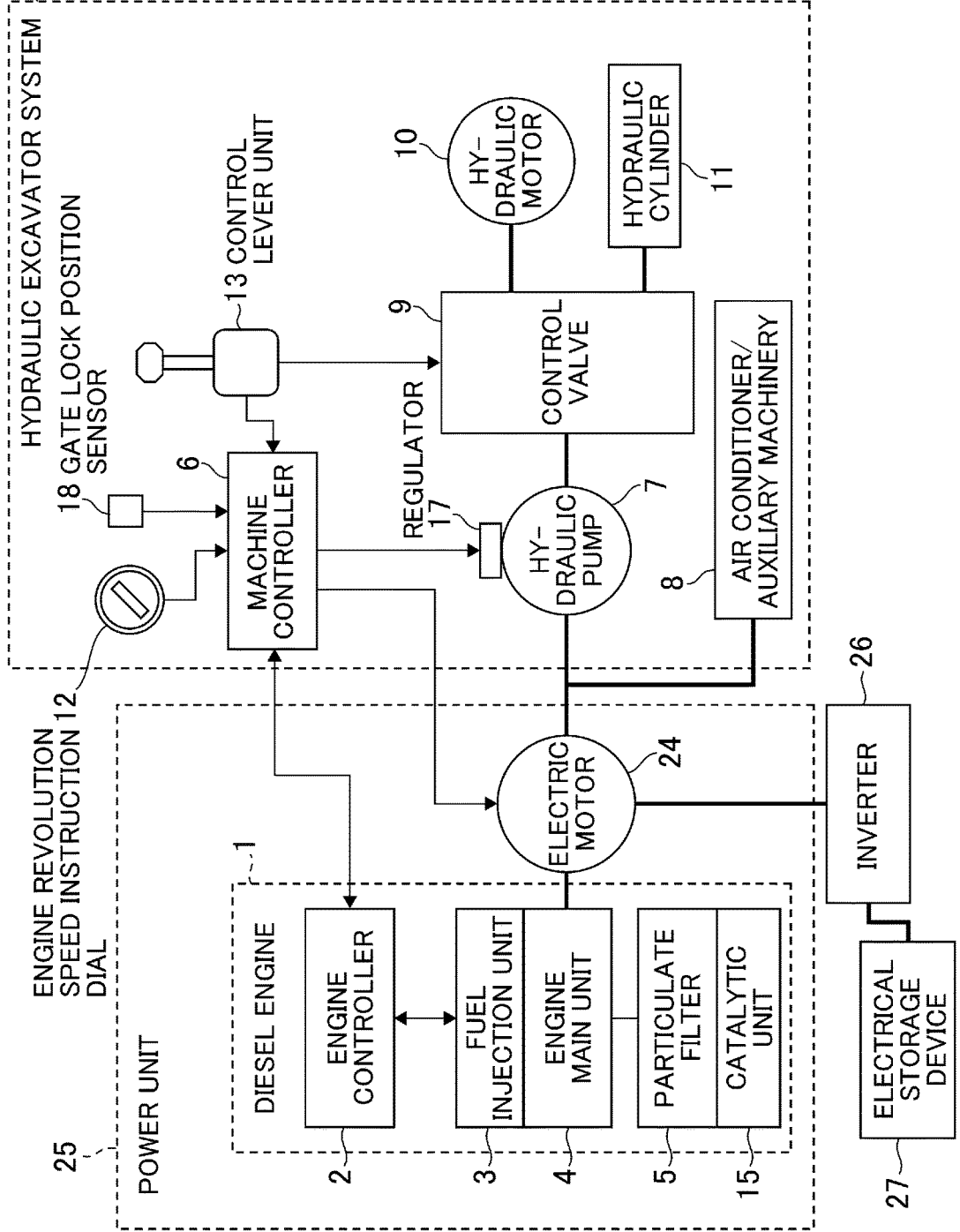
FIG. 7 is a diagram showing an overall system of a hydraulic excavator according to a second embodiment of the present invention.

In FIG. 7, the system of the work machine according to this embodiment includes a diesel engine 1, an electric motor 24, an inverter 26 and an electrical storage device 27. The diesel engine 1 and the electric motor 24 constitute a power unit 25. The output shaft of the electric motor 24 is coupled to the output shaft of the engine main unit 4 so that the hydraulic pump 7 is driven by both the electric motor 24 and the engine 1. The electric motor 24, which is controlled by the inverter 26, is electrically connected to the electrical storage device 27.

Figure 8:
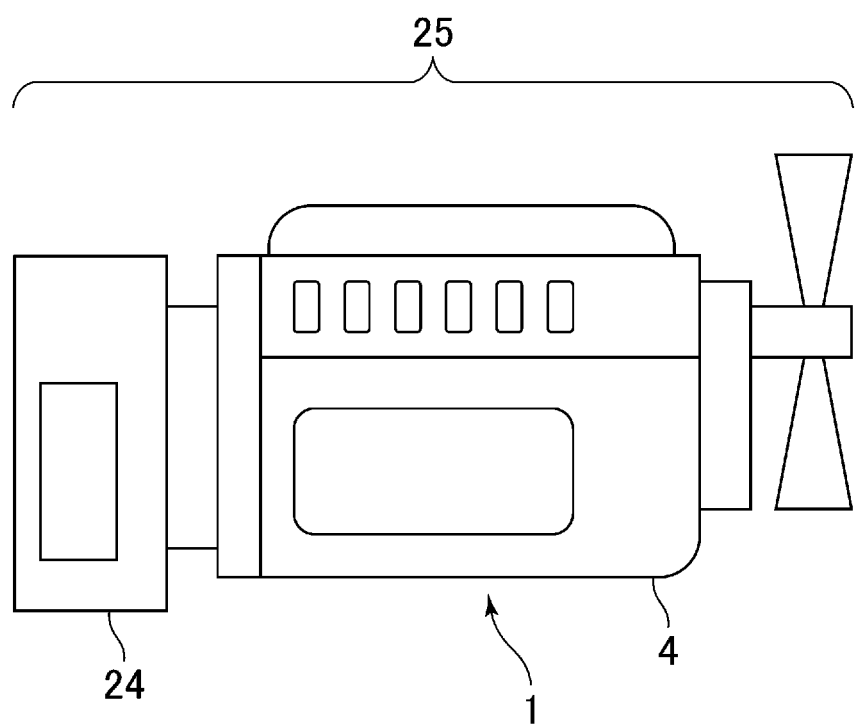
FIG. 8 is a diagram showing a diesel engine and an electric motor of a power unit.

FIG. 8 is a diagram showing the diesel engine 1 and the electric motor 24 of the power unit 25. As shown in FIG. 8, a rotor part (not shown) of the electric motor 24, instead of a flywheel, is directly connected to the power shaft of the engine main unit 4 to form an integral power unit 25. Thus, the electric motor 24 can be handled equivalently to the diesel engine 1 in terms of hardware.

Figure 9:
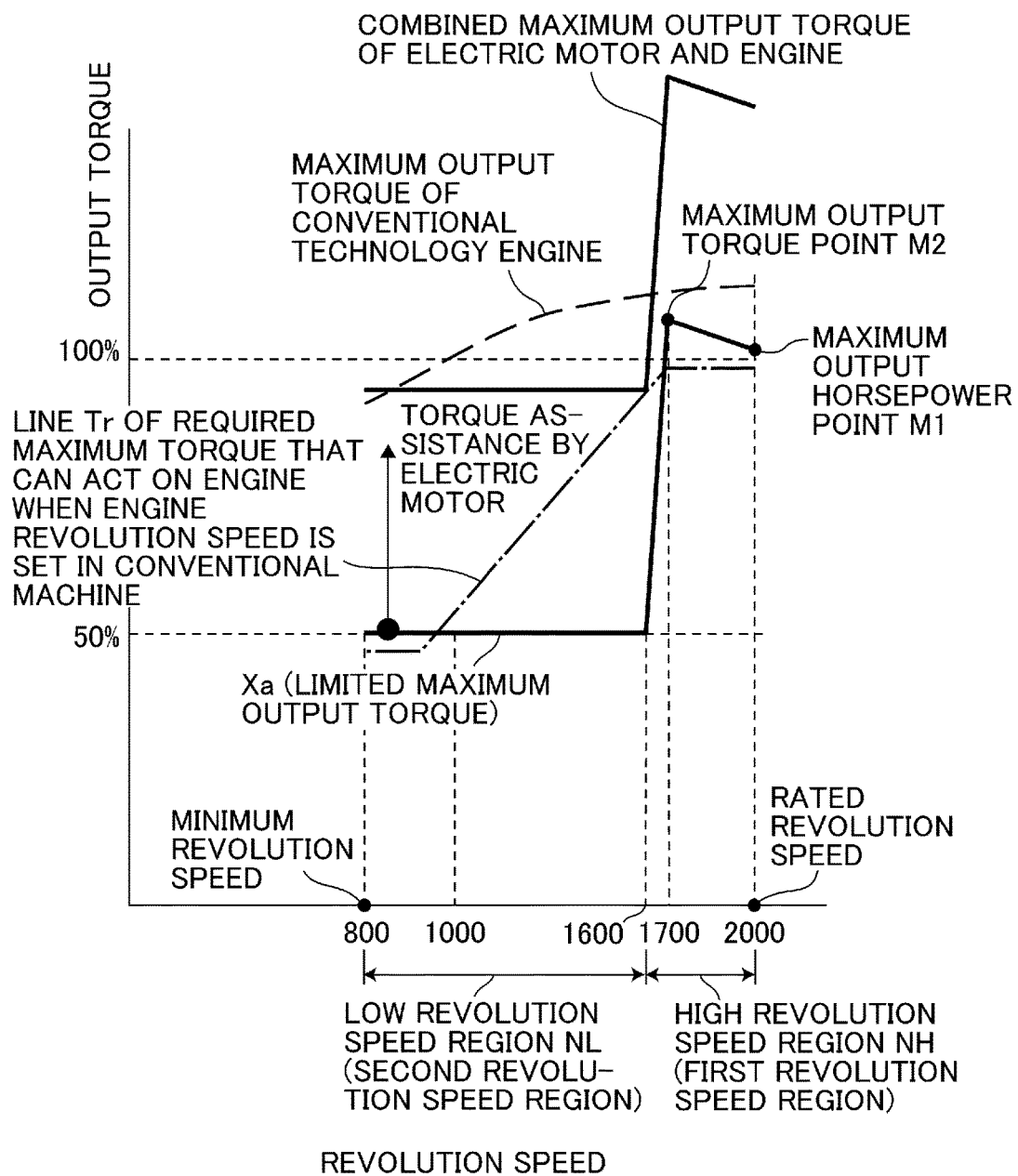
FIG. 9 is a diagram showing an example of a maximum output torque diagram of the power unit including torque assistance by the electric motor.
Figure 10:
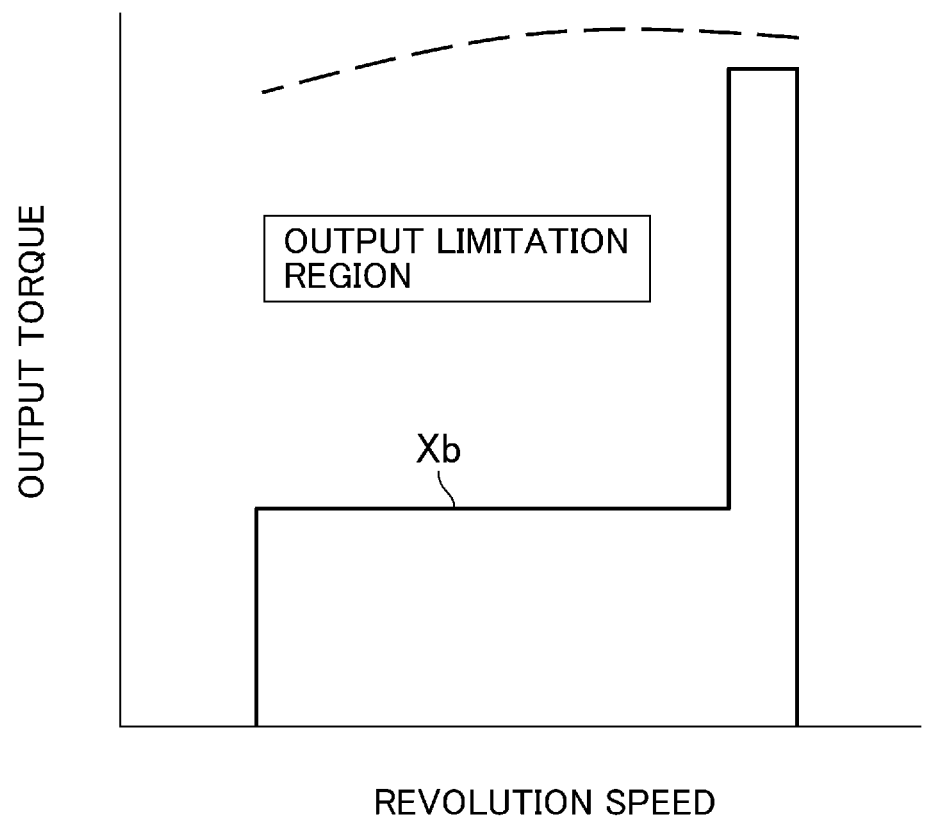
FIG. 10 is a diagram showing another example of the maximum output torque diagram (engine revolution speed vs. output torque diagram) of an engine according to the present invention.
Figure 11:
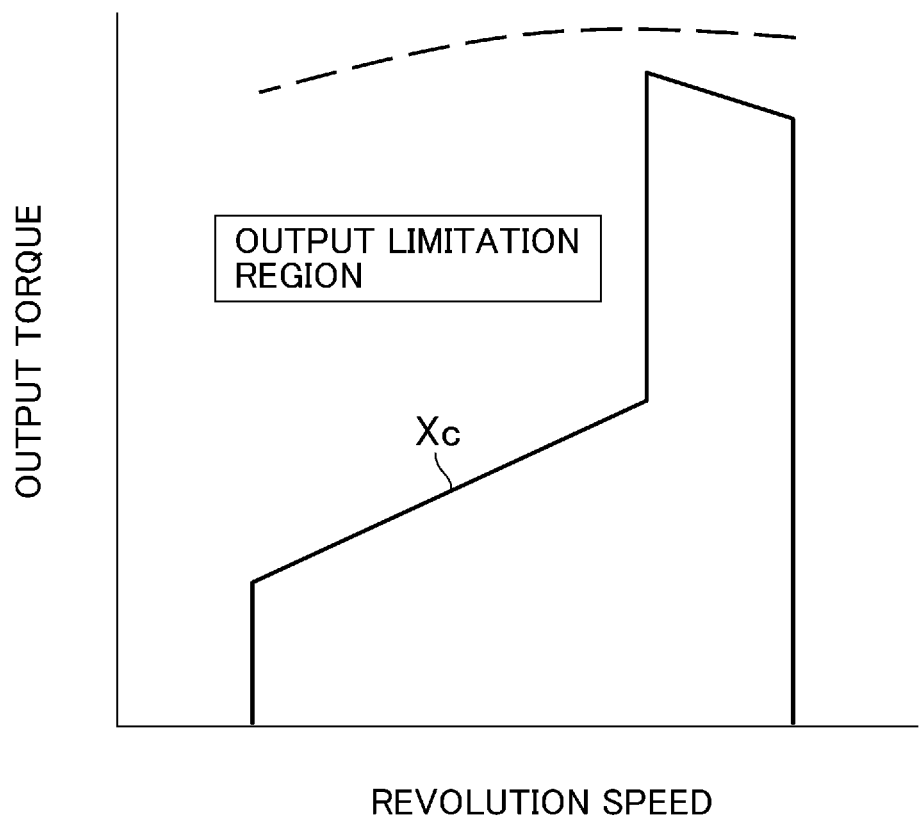
FIG. 11 is a diagram showing still another example of the maximum output torque diagram (engine revolution speed vs. output torque diagram) of an engine according to the present invention.
Figure 12:
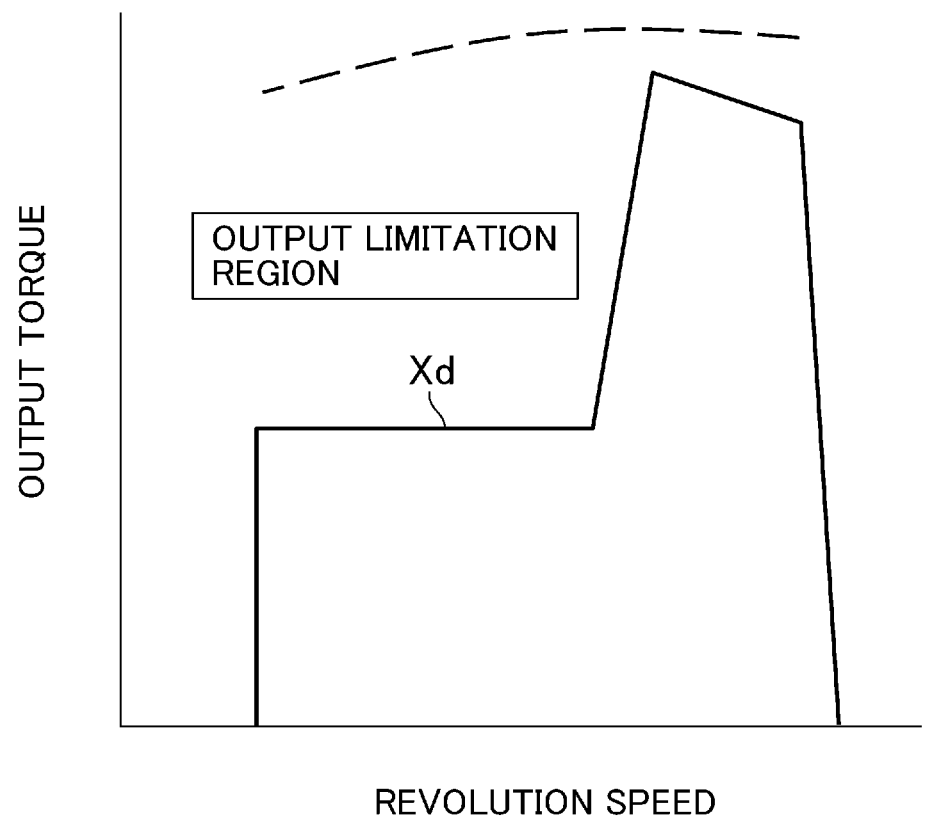
FIG. 12 is a diagram showing still another example of the maximum output torque diagram (engine revolution speed vs. output torque diagram) of an engine according to the present invention.
Figure 13:
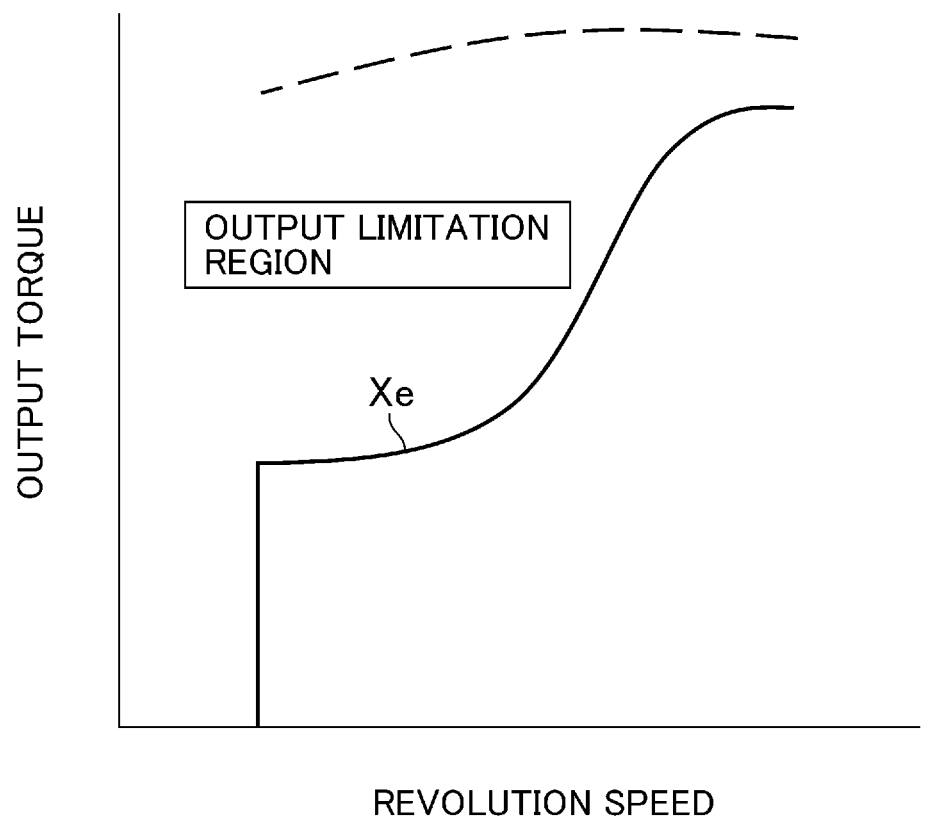
FIG. 13 is a diagram showing still another example of the maximum output torque diagram (engine revolution speed vs. output torque diagram) of an engine according to the present invention.
Figure 14:
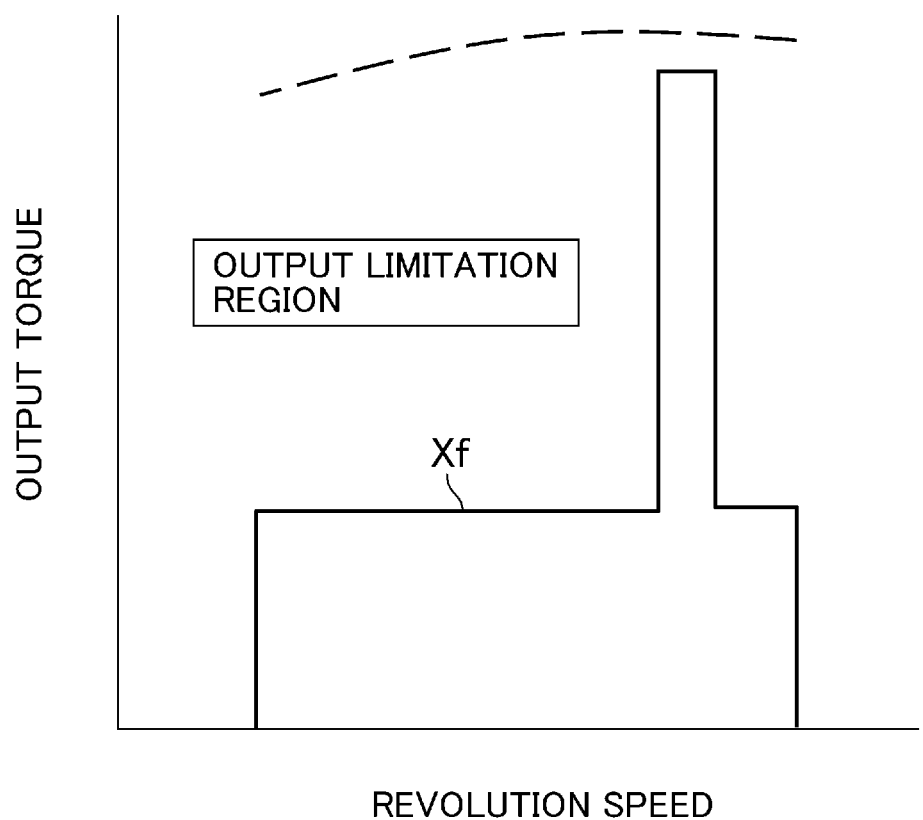
FIG. 14 is a diagram showing still another example of the maximum output torque diagram (engine revolution speed vs. output torque diagram) of an engine according to the present invention.
Figure 15:
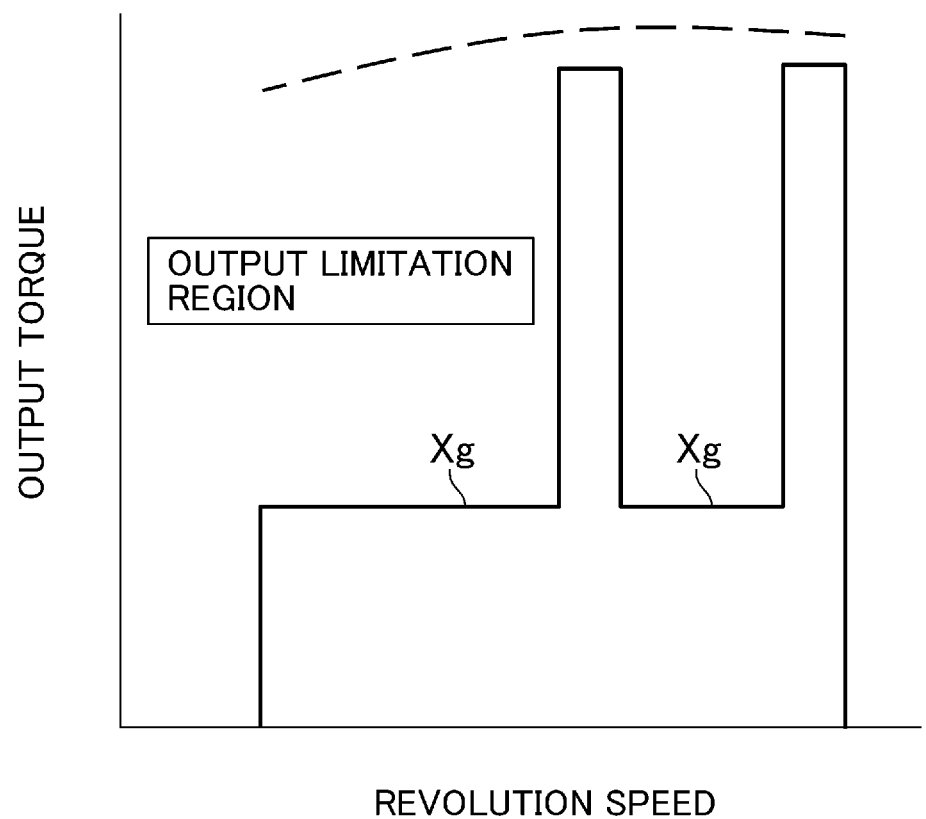
FIG. 15 is a diagram showing still another example of the maximum output torque diagram (engine revolution speed vs. output torque diagram) of an engine according to the present invention.
Figure 16:
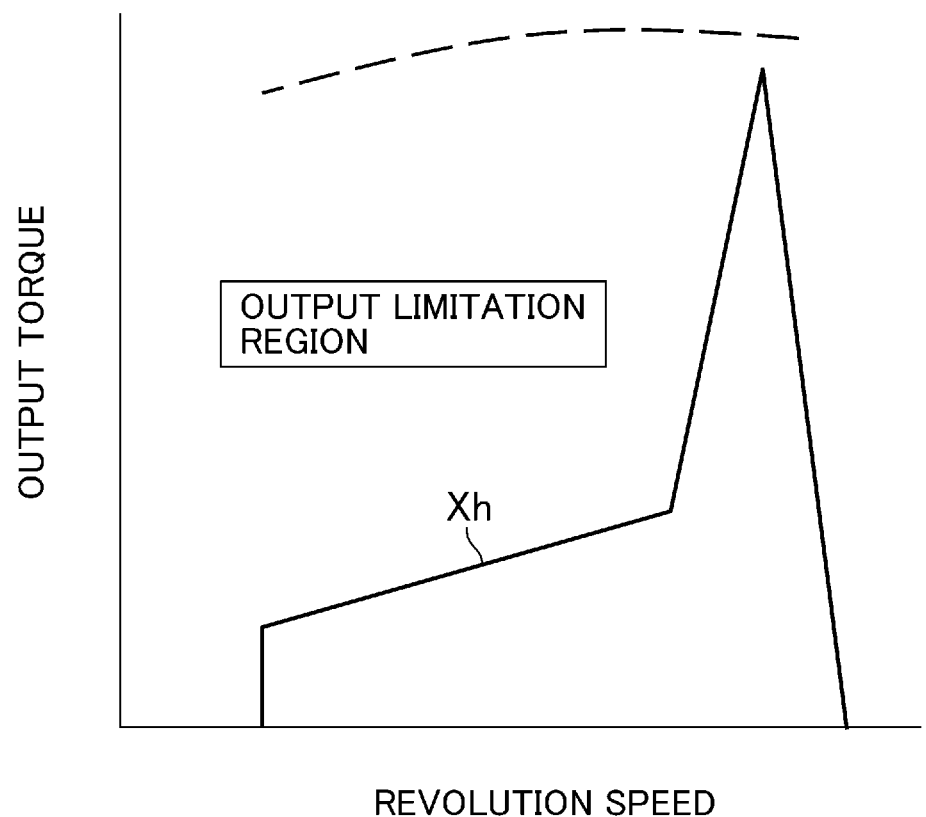
FIG. 16 is a diagram showing still another example of the maximum output torque diagram (engine revolution speed vs. output torque diagram) of an engine according to the present invention.
Figure 17:
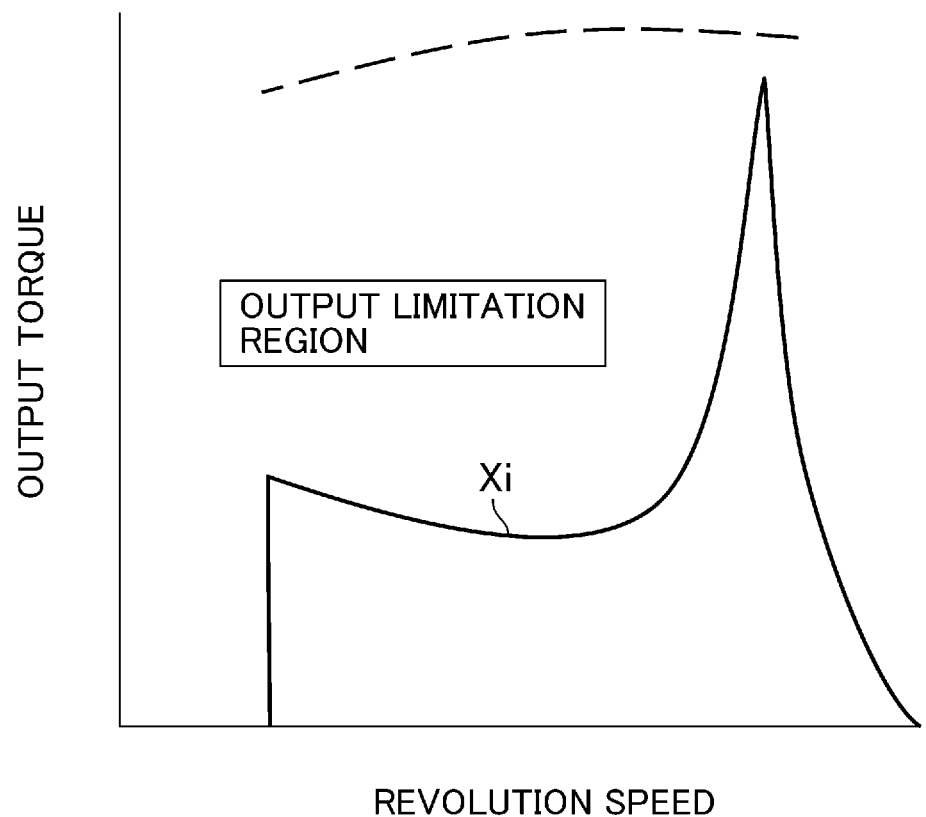
FIG. 17 is a diagram showing still another example of the maximum output torque diagram (engine revolution speed vs. output torque diagram) of an engine according to the present invention.

FIG. 9 is a diagram showing an example of a maximum output torque diagram of the power unit 25 including the torque assistance by the electric motor 24.

By combining the electric motor 24 with the engine main unit 4, the output torque of the electric motor 24 can be supplied to the diesel engine 1 and the required output torque indicated by the chain line can be secured as shown in FIG. 9.

By handling the combination of the engine 1 and the electric motor 24 as the power unit 25 as above, the hydraulic excavator can be operated similarly to the case of the standard type of diesel engine without the need of carrying out particular control on the hydraulic system's side. Further, increasing the output torque of the electric motor 24 makes it possible to operate a machine of higher load output with respect to the output power of the diesel engine 1.

However, since the electric energy stored in the electrical storage device 27 is limited, it is necessary to separately perform control for maintaining the electric energy of the electrical storage device 27 within an appropriate range, such as charging the electrical storage device 27 by applying negative torque to the electric motor 24 and thereby making the electric motor 24 perform the power generation operation when the hydraulic load is low or charging the electrical storage device 27 from another electric power regeneration means not illustrated.

Other Examples

FIGS. 10 to 17 show examples of maximum output torque characteristics Xb to Xi of various engines according to the present invention. These are all contained in the concept of the present invention.

As described above, the essence of the present invention is to use a diesel engine 1 with the limitation on the maximum output torque like those shown in FIG. 3 and FIGS. 10 to 17 and operate the work machine in combination with the engine revolution speed control, the displacement volume control of the variable displacement hydraulic pump 7 or the electric motor control performed by the system on the work machine's side.

Incidentally, while a hydraulic excavator is described in the embodiments as an example of the work machine, the present invention is applicable to any type of work machine including a hydraulic actuator driven by a hydraulic pump, such as a wheel loader, a forklift and a crane. Further, while a work machine in many cases includes a plurality of hydraulic actuators driven by a hydraulic pump, the present invention is applicable also to cases where a hydraulic pump drives a single hydraulic actuator (e.g., forklift).

DESCRIPTION OF REFERENCE CHARACTERS

1: Diesel engine
2: Engine controller
3: Fuel injection unit
4: Engine main unit
5: Particulate filter
6: Machine controller
7: Hydraulic pump
8: Air conditioner/auxiliary machinery
9: Control valve
10: Hydraulic motor
11: Hydraulic cylinder
12: Engine revolution speed instruction dial (revolution speed instruction unit)
13: Control lever unit
14: Hydraulic excavator system
15: Catalytic unit
24: Electric motor
25: Power unit
26: Inverter
27: Electrical storage device

The invention claimed is:

1. A work machine comprising:
a diesel engine;
at least one hydraulic pump driven by the diesel engine; and
at least one hydraulic actuator driven by hydraulic fluid delivered from the hydraulic pump,
wherein the diesel engine is configured to have a first revolution speed region including a rated revolution speed having a maximum output horsepower point and a second revolution speed region lower than the first revolution speed region and in which a fuel injection amount is controlled by an engine controller to limit a maximum output torque of the diesel engine in such a manner that a maximum output torque of the diesel engine in the second revolution speed region has a characteristic of intermediate torque lower than a torque at the maximum output horsepower point in the first revolution speed region.

2. The work machine according to claim 1, wherein the maximum output torque limited in the second revolution speed region is lower than a maximum load torque that acts on the diesel engine when a target revolution speed of the diesel engine is set in the second revolution speed region and the work machine is to be driven at the set revolution speed.

3. The work machine according to claim 2, wherein the maximum load torque that can act on the diesel engine corresponds to a total of a drag torque of the hydraulic pump and the diesel engine and a maximum torque that is required for the hydraulic pump when a target revolution speed of the diesel engine is set in the second revolution speed region and the work machine is to be driven at the set revolution speed.

4. The work machine according to claim 1, wherein the maximum output torque limited in the second revolution speed region is lower than or equal to 75% of torque of a maximum output torque point of the diesel engine.

5. The work machine according to claim 1, wherein
the first revolution speed region includes a revolution speed of a maximum output torque point of the diesel engine,
the revolution speed of the maximum output torque point is a revolution speed larger than or equal to 75% of the rated revolution speed, and
the second revolution speed region is lower than the revolution speed of the maximum output torque point of the diesel engine.

6. The work machine according to claim 1, wherein the diesel engine includes a fuel injection unit and an electronic control unit for controlling the fuel injection unit, and the electronic control unit is configured to limit the maximum output torque by limiting an injection amount of fuel supplied from the fuel injection unit.

7. The work machine according to claim 1, wherein the diesel engine controls a fuel injection unit so as to carry out premixed combustion in the second revolution speed region.

8. The work machine according to claim 1, wherein the diesel engine controls a fuel injection unit so as to carry out premixed combustion on a low torque side in the first revolution speed region and carry out diffusive combustion on a high torque side in the first revolution speed region.

9. The work machine according to claim 1, wherein the diesel engine controls a revolution speed and a torque by means of revolution speed control to adjust an actual revolution speed to a target revolution speed.

10. The work machine according to claim 1, wherein the diesel engine is equipped with at least one of a filter for removing particulate matter contained in exhaust gas and a catalyst for reducing noxious substances contained in exhaust gas.

11. The work machine according to claim 1, further comprising an electric motor used in combination with the diesel engine to drive the hydraulic pump.

12. The work machine according to claim 1, further comprising:
a revolution speed instruction unit for setting a target revolution speed of the diesel engine; and
a control unit that instructs the target revolution speed set by the revolution speed instruction unit to the diesel engine when the target revolution speed set by the revolution speed instruction unit is in the second revolution speed region and the hydraulic actuator is not driven, and increases the target revolution speed to a revolution speed in the first revolution speed region and instructs the increased target revolution speed to the diesel engine when the target revolution speed set by the revolution speed instruction unit is in the second revolution speed region and the hydraulic actuator is driven.

13. The work machine according to claim 1, wherein
the hydraulic pump is a variable displacement type, and
the control unit calculates a required maximum output horsepower at the target revolution speed set by the revolution speed instruction unit when the hydraulic actuator is driven and the target revolution speed is increased to the revolution speed in the first revolution speed region, and the control unit controls a maximum torque of the hydraulic pump in such a manner that an absorption horsepower of the hydraulic pump does not exceed the required maximum output horsepower, when the revolution speed of the diesel engine has increased to the first revolution speed region.

14. A power unit comprising a diesel engine configured to have a first revolution speed region including a rated revolution speed having a maximum output horsepower point and a second revolution speed region lower than the first revolution speed region and in which a fuel injection amount is controlled by an engine controller to limit an output torque of the diesel engine in such a manner that a maximum output torque of the diesel engine in the second revolution speed region has a characteristic of intermediate torque lower than a torque at the maximum output horsepower point in the first revolution speed region, and an electric motor used in combination with the diesel engine to drive the hydraulic pump, the diesel engine and the electric motor being integrated as a unit.

15. A diesel engine installed in a work machine and configured to have a first revolution speed region including a rated revolution speed having a maximum output horsepower point and a second revolution speed region lower than the first revolution speed region and in which a fuel injection amount is controlled by an engine controller to limit an output torque of the diesel engine in such a manner that a maximum output torque of the diesel engine in the second revolution speed region has a characteristic of intermediate torque lower than a torque at the maximum output horsepower point in the first revolution speed region.

\* \* \* \* \*